United States Patent
Wang et al.

(10) Patent No.: US 10,866,962 B2
(45) Date of Patent: Dec. 15, 2020

(54) DATABASE MANAGEMENT SYSTEM FOR MERGING DATA INTO A DATABASE

(71) Applicant: DataInfoCom USA, Inc., Austin, TX (US)

(72) Inventors: Chun Wang, Austin, TX (US); Rick Thielke, Austin, TX (US); Mubbashir Nazir, Kolkata (IN); Sean Yang, Austin, TX (US); Wensu Wang, Austin, TX (US); Michael Smith-Palmer, Austin, TX (US)

(73) Assignee: DataInfoCom USA, Inc., Austin, TX (US)

( * ) Notice: Subject to any disclaimer, the term of this patent is extended or adjusted under 35 U.S.C. 154(b) by 208 days.

(21) Appl. No.: 16/146,590

(22) Filed: Sep. 28, 2018

(65) Prior Publication Data

US 2019/0102342 A1 Apr. 4, 2019

Related U.S. Application Data

(60) Provisional application No. 62/564,468, filed on Sep. 28, 2017.

(51) Int. Cl.
| | |
|---|---|
| *G06F 7/14* | (2006.01) |
| *G06F 16/25* | (2019.01) |
| *G06F 16/245* | (2019.01) |

(52) U.S. Cl.
CPC ............ *G06F 16/258* (2019.01); *G06F 7/14* (2013.01); *G06F 16/245* (2019.01)

(58) Field of Classification Search
None
See application file for complete search history.

(56) References Cited

U.S. PATENT DOCUMENTS

| | | | |
|---|---|---|---|
| 4,449,896 A | 5/1984 | Klepper et al. |
| 6,021,377 A | 2/2000 | Dubinsky |
| 6,574,565 B1 | 6/2003 | Bush |
| 6,732,052 B2 | 5/2004 | Macdonald |
| 6,820,702 B2 | 11/2004 | Niedermayr |
| 6,968,909 B2 | 11/2005 | Aldred |
| 7,142,986 B2 | 11/2006 | Moran |
| 7,303,010 B2 | 12/2007 | de Guzman |
| 7,908,230 B2 | 3/2011 | Bailey |

(Continued)

OTHER PUBLICATIONS

"Date" Merriam-Webster.com [downloaded May 8, 2018]; https://www.merriam-webster.com/dictionary/date.

(Continued)

*Primary Examiner* — Wilson Lee
(74) *Attorney, Agent, or Firm* — Chad Peterson

(57) ABSTRACT

A system for merging data into a database is disclosed. During operation, the system may fetch a set of data from a data source external to the database. The system may determine that the fetched set of data is unstructured data, and then transform the fetched set of data into structured data. The system may also determine one or more lowest denominators for the fetched set of data, determine that the fetched set of data does not meet the one or more lowest denominators, and transform the fetched set of data to meet the one or more lowest denominators. The system may further determine one or more joinable keys for the fetched set of data, and merge the fetched set of data into the database.

6 Claims, 30 Drawing Sheets

(56) References Cited

U.S. PATENT DOCUMENTS

| | | | |
|---|---|---|---|
| 7,963,327 B1 | 6/2011 | Saleri et al. | |
| 8,036,979 B1* | 10/2011 | Torrez | G06Q 10/04 705/38 |
| 8,121,971 B2 | 2/2012 | Edwards | |
| 8,170,800 B2 | 5/2012 | Aamodt | |
| 8,209,218 B1 | 6/2012 | Basu et al. | |
| 8,364,519 B1 | 1/2013 | Basu et al. | |
| 8,474,550 B2 | 7/2013 | Byreddy | |
| 8,738,425 B1 | 5/2014 | Basu et al. | |
| 9,031,889 B1 | 5/2015 | Basu et al. | |
| 9,163,497 B2 | 10/2015 | Laing et al. | |
| 9,230,211 B1 | 1/2016 | Basu et al. | |
| 9,424,518 B1 | 8/2016 | Basu et al. | |
| 9,605,529 B1 | 3/2017 | Venter et al. | |
| 9,617,834 B1 | 4/2017 | Venter et al. | |
| 9,617,843 B1 | 4/2017 | Venter et al. | |
| 9,678,487 B1 | 6/2017 | Basu et al. | |
| 9,785,731 B1 | 10/2017 | Venter et al. | |
| 2002/0087544 A1* | 7/2002 | Selkirk | G06F 3/0608 |
| 2003/0089502 A1 | 5/2003 | Dallas | |
| 2004/0220846 A1 | 11/2004 | Cullick et al. | |
| 2005/0192855 A1 | 9/2005 | Chitty et al. | |
| 2006/0024171 A1 | 2/2006 | Smith | |
| 2006/0222266 A1* | 10/2006 | Lauze | G06T 3/4007 382/299 |
| 2007/0289740 A1 | 12/2007 | Thigpen | |
| 2008/0183451 A1 | 7/2008 | Weng | |
| 2008/0209997 A1 | 9/2008 | Bailey | |
| 2008/0281525 A1 | 11/2008 | Boone | |
| 2008/0289875 A1 | 11/2008 | Burge | |
| 2009/0024443 A1 | 1/2009 | Graham | |
| 2009/0073376 A1* | 3/2009 | Swift | G02C 7/086 351/59 |
| 2009/0125362 A1 | 5/2009 | Reid et al. | |
| 2009/0132458 A1 | 5/2009 | Edwards et al. | |
| 2009/0157367 A1 | 6/2009 | Meyer | |
| 2009/0157590 A1 | 6/2009 | Mijares et al. | |
| 2009/0210081 A1 | 8/2009 | Sustaeta | |
| 2009/0287628 A1* | 11/2009 | Indeck | G06F 16/24568 706/47 |
| 2010/0042458 A1 | 2/2010 | Rashid | |
| 2010/0108322 A1 | 5/2010 | Eilertsen | |
| 2011/0174541 A1 | 7/2011 | Strachan | |
| 2012/0059521 A1 | 3/2012 | Iversen | |
| 2012/0116740 A1 | 5/2012 | Fourno et al. | |
| 2012/0253932 A1* | 10/2012 | Kim | G06Q 30/06 705/14.53 |
| 2012/0316787 A1 | 12/2012 | Moran | |
| 2013/0124176 A1 | 5/2013 | Fox | |
| 2013/0140031 A1 | 6/2013 | Cohen et al. | |
| 2013/0311270 A1 | 11/2013 | Daftary | |
| 2014/0067353 A1 | 3/2014 | Shelley et al. | |
| 2014/0070956 A1 | 3/2014 | Winkler | |
| 2014/0218165 A1* | 8/2014 | Johnson | G07C 9/00857 340/5.25 |
| 2014/0297235 A1 | 10/2014 | Arora et al. | |
| 2014/0310071 A1 | 10/2014 | Conradson et al. | |
| 2014/0365409 A1 | 12/2014 | Burch et al. | |
| 2015/0039544 A1 | 2/2015 | Gupta | |
| 2015/0053482 A1 | 2/2015 | Boone | |
| 2015/0114630 A1 | 4/2015 | Colvin | |
| 2015/0150017 A1* | 5/2015 | Hu | G06F 12/00 718/103 |
| 2015/0186567 A1 | 7/2015 | Wu | |
| 2015/0234954 A1 | 8/2015 | Samuel | |
| 2015/0278407 A1 | 10/2015 | Vennelakanti et al. | |
| 2015/0284811 A1 | 10/2015 | Knight | |
| 2015/0300151 A1 | 10/2015 | Mohaghegh | |
| 2015/0356403 A1 | 12/2015 | Storm, Jr. | |
| 2016/0042272 A1 | 2/2016 | Mohaghegh | |
| 2016/0358312 A1* | 12/2016 | Kolb | G06T 5/20 |
| 2017/0058658 A1 | 3/2017 | Spencer | |
| 2017/0103167 A1* | 4/2017 | Shah | G06Q 50/24 |
| 2017/0286879 A1 | 10/2017 | Yeager | |
| 2017/0292362 A1 | 10/2017 | Aniket | |
| 2017/0342808 A1 | 11/2017 | Dykstra et al. | |
| 2018/0016895 A1 | 1/2018 | Weng et al. | |
| 2018/0080306 A1 | 3/2018 | Passolt | |
| 2018/0322166 A1* | 11/2018 | Geigel | G06F 16/2428 |
| 2019/0102476 A1* | 4/2019 | Liu | G06F 16/2471 |

OTHER PUBLICATIONS

"Field", Merriam-Webster.com [downloaded Apr. 26, 2018]; https://www.merriam-webster.com/dictionary/field.

"Prescribe" Merriam-Webster.com [downloaded May 9, 2018]; webster.com/dictionary/prescribe.

"Recipe" Merriam-Webster.com [downloaded May 10, 2018]; https://www.merriamwebster.com/dictionary/recipe.

Al-Yami et al. "Expert System for the Optimal Design and Execution of Successful Completion Practices Using Artificial Bayesian Intelligence" SPE 143826 (2011); Society of Petroleum Engineers [downloaded Mar. 5, 2018]; https://www.onepetro.org/conference-paper/SPE-143826-MS.

Butler, R. "Steam and Gas Push (SAGP)" 48th Annual Technical Meeting of the Petroleum Society (1997); Alberta, Canada [downloaded Mar. 28, 2018] https://www.onepetro.org/conference-paper/PETSOC-97-137.

Clegg, J. D. et al., Recommendations and Comparisons for Selecting Artificial-Lift Methods (includes associated papers 28645 and 29092); Journal of Petroleum Technology 45.12 (Dec. 1993 and Jul. 1994); pp. 1128-1167 and pp. 621-622.

Economides et al. "Reservoir Stimulation" 3rd Edition (2000): Wiley, Chap 10 [downloaded May 1, 2018]; https://www.researchgate.net/profile/Azeez_Aregbe/post/measuring_fracture_length_and_width_using_PKN_and_ KGD_modelsJor_hydraulic_fracturing/attachment/59d64ed379197b80779a8171/AS:494639238529025g1494942593011/download/RS_REF.pdf.

Edwards et al. "Marcellus Shale Hydraulic Fracturing and Optimal Well Spacing to Maximize Recovery and Control Costs" SPE140463 (2011): Society of Petroleum Engineers [downloaded Mar. 5, 2018]; https://www.onepetro.org/conference-paper/SPE-140463-MS.

Ketter et al. "A Field Study in Optimizing Completion Strategies for Fracture Initiation in Barnett Shale Horizontal Wells" SPE103232 (2008); Society of Petroleum Engineers [downloaded Mar. 5, 2018]; https://www.onepetro.org/journalpaper/SPE-103232-PA.

Rahim et al. "Evaluation and Selection of Stimulation Methods in Horizontal Gas Wells for Production Optimization Using Numerical Modeling of Well Performance" SPE 167090 (2013); Society of Petroleum Engineers [downloaded Mar. 5, 2018]; https://www.onepetro.org/conference-paper/SPE-167090-MS.

Teichrob et al. "Well Construction Optimization in the Motney Formation in the Karr Kakwa Area of Central Western Alberta: A Case Study" SPE 162734 (2012) [downloaded Mar. 20, 2018], https://www.onepetro.org/conference-paper/SPE162734-MS.

Welling et al. "Quantifying the Factors Influencing Gravel Placement and Productivity of an Internally Gravel Packed Completion based on Field Data Analysis" SPE 30113 (1995): Society of Petroleum Engineers [downloaded Mar. 5, 2018]; https://www.onepetro.org/conference-paper/SPE-30113-MS.

Babaniyazov et al. "Methodological Approach for Optimization of Completion Practices in Mature Carbonate Fields" SPE 166249 (2013); Society of Petroleum Engineers [downloaded May 1, 2018]; https://www.onepetro.org/conferencepaper/SPE-166249-MS.

Devoid, Havard; Oil and gas production handbook: an introduction to oil and gas production. Lulu. com, 2013; pp. 1-8, 33-36, 80-82, 102-104.

Lalehrokh et al. "Well Spacing Optimization in Eagle Ford" SPE 171640-MS (2014); Society of Petroleum Engineers [downloaded Mar. 5, 2018]; https://www.onepetro.org/ conference-paper/SPE-171640-MS.

Rizzo et al., "An Ontology Based for Drilling Report Classification," Springer-Verlag Berlin Heidelberg 2006 (Year: 2006).

Serapiao et al., "Classification of Petroleum Well Drilling Operations Using Support Vector Machine (SVM)," IEEE (2006).

(56) References Cited

OTHER PUBLICATIONS

Schlumberger, "FracCADE Stimulation Proposal" Example 8: (2013) [downloaded May 1, 2018]; http://ocdimage.emnrd.state.nm.us/imaging/filestore/SantaFeAdmin/CF/259053/15235_13_CF.pdf.
U.S. Appl. No. 15/052,546, filed Feb. 24, 2016.
U.S. Appl. No. 15/052,559, filed Feb. 24, 2016.
U.S. Appl. No. 15/052,579, filed Feb. 24, 2016.
U.S. Appl. No. 15/052,608, filed Feb. 24, 2016.
U.S. Appl. No. 15/052,621, filed Feb. 24, 2016.
U.S. Appl. No. 15/052,634, filed Feb. 24, 2016.
U.S. Appl. No. 15/052,646, filed Feb. 24, 2016.
U.S. Appl. No. 15/052,653, filed Feb. 24, 2016.
U.S. Appl. No. 15/052,658, filed Feb. 24, 2016.
U.S. Appl. No. 15/052,660, filed Feb. 24, 2016.
U.S. Appl. No. 15/052,667, filed Feb. 24, 2016.
U.S. Appl. No. 15/052,567, filed Feb. 24, 2016.
Cambridge Dictionary (engine): Cambridge University Press [retrieved on Oct. 19, 2018]. Retrieved from <https://dictionary.cambridge.org/us/dictionary/english/engine> (Year: 2018).
Dursun et al. "A Workflow for Intelligent Data-Driven Analytics Software Development in Oil and Gas Industry" SPE-170859-MS, Society of Petroleum Engineers [retrieved on Oct. 20, 2018]. Retrieved from <https://www.onepetro.org/conference-paper/SPE-170859-MS?event-fire=false> (Year: 2014).
Singh, S. "How are Oil Well Drilling Companies Using Analytics" Analytics and Big Data [blog post] : Genpact [retrieved on Oct. 20, 2018]. Retrieved from <https://www.genpact.com/insight/blog/how-are-oil-well-drilling-companies-using-analytics-to-drive-productivity-and-the-return-on-assets> (Year: 2015).
Johnston et al. "New Findings in Drilling and Wells using Big Data Analytics" OTC-26021-MS, Offshore Technology Conference [retrieved on Oct. 20, 2018]. Retrieved from <https://www.onepetro.org/conference-paper/OTC-26021-MS> (Year: 2015).
"How do we improve drilling efficiency and predict events" Oil and Gas, [Solution Brief]: SAS [retrieved on Oct. 20, 2018]. Retrieved from <https://web.archive.org/web/20150919235922/https://www.sas.com/content/dam/SAS/en us/doc/solutionbrief/ oil-and-gas-improve-drilling-efficiency-106477.pdf> (Year: 2015).
Austin, E.H. "Drilling Engineering Handbook." (1984). (Year: 1984).
Sumotarto, U. "Sandstone Acidizing Simulation: Development of an Expert System" ProQuest Dissertations and Theses [retrieved on Feb. 6, 2019]. Retrieved from <https://search.proquest.com/docview/304236236/fulltextPDF/487D9138EE634D17PQ/1?accountid=14753> (Year: 1995).
Sidahmed et al. "Augmenting Operations Monitoring by Mining Unstructured Drilling Reports" SPE-173429-MS, Mar. 2015, The Woodlands, Texas, USA [retrieved on Feb. 8, 2019]. Retrieved from <https://www.onepetro.org/conference-paper/SPE-173429-MS> (Year: 2015).
Kravis et al. "A Case Based System for Oil and Gas Well Design with Risk Assessment" Applied Intelligence, vol. 23, pp. 39-53 [retrieved on Feb. 6, 2019]. Retrieved from <https://link.springer.com/content/pdf/10.1007/s10489-005-2371-7.pdf> (Year: 2005).
Irrgang et al. "Drilling Knowledge Management, What is Missing and Can We Fix it?" IADC/SPE 77249, IADC/SPE Asia Pacific Drilling Technology, Jakarata, Indonesia [retrieved on Feb. 8, 2019]. Retrieved from <https://www.onepetro.org/conference-paper/ SPE-77249-MS> (Year: 2002).
Yusof et al. "Development of mathematical model for hydraulic fracturing design" Journal of Petroleum Exploration and Production Technologym vol. 5, Iss. 3, pp. 269-276 [retrieved on May 2, 2018]. Retrieved from <https://link.springer.com/article/10.1007/s13202-014-0124-z> (Year: 2014).

* cited by examiner

Figure 6A: External Geo-Demographic Data Categories with Representative Attributes

| Internal | External |
|---|---|
| None | • Total Population<br>    By Age<br>    By Gender<br>    By Marital Status<br>    By Veteran Status<br><br>• Population Density<br>• Populaton Change<br>• Educational Attainment<br><br>• Employment Status<br>    Total Workers In Labor Force<br>        Civilian Labor Force - Employed<br>        Civilian Labor Force - Unemployed<br>        Armed Forces<br>    Population Not in Labor Force<br><br>• Occupation<br>    Management, Business, Science, and Arts<br>    Service<br>    Sales / Office<br>    Natural Resources, Construction, and Maintenance<br>    Production, Transportation, Materials Handling<br>• Worker Class<br>    Civilian<br>      Private<br>      Government<br>      Self Employed<br>    Unpaid Family workers<br>    Military<br><br>• Local Industry Representation<br>• Number of vehicles per household<br>• Means of Transportation to Work<br><br>• Median Household Income<br>• Food Stamp Utilization<br>• Percentage of households at or below the Poverty Level |

Figure 6B: External Geo-Economic Data Categories with Representative Attributes

| Internal | External | |
|---|---|---|
| | Consumer Price Index | • CPI - Medical Care<br>    Cost of Prescription and OTC drugs<br>    Fees related to professional services provided physicians, dentists, and opticians<br>    Hospital, Nursing Home, and Specialized care service costs<br>    Insurance costs, including commercial medial insurance, BCBS, and HMO premiums<br><br>• CPI - Transportation<br>    Cost of motor vehicle maintenance and repairs<br>    Cost of motor vehicle insurance premiums |
| | Retail Gasoline Prices | • Per-gallon fuel costs |
| | Residential Real Estate Market Health | • Single Family Home Values<br>    Single Family Home Values - Absolute<br>    Single Family Home Values - Normalized $/sqft<br>    Single Family Home Rental Prices - Absolute<br>    Single Family Home Rental Prices - Normalized $/sqft<br><br>• Condominimum/Apartment Values<br>    Condominum Values - Absolute<br>    Condominum Values - Normalized/sqft<br>    Apartment Values - Absolute<br>    Apartment Values - Normalized/sqft<br><br>• Residential Rental Rates<br>    Monthly Apartment Rental Rates - Absolute<br>    Monthly Apartment Rental - Normalized $/sqft<br>    Monthly Home Rental Rates - Absolute<br>    Monthly Home Rental Rates - $ per square foot<br><br>• Residential Real Estate Market Data<br>    Homes sold for loss (%)<br>    Homes sold for gain (%)<br>    Foreclosures<br>    Price-to-Rent Ratio<br>    Price to Income ratio<br>    For Sale Inventory<br>    Inventory Age<br><br>• Economic Indicators<br>    Conventional Mortgage Rates<br>    Jumbo Mortgage Rates<br>    New Residential Construction<br>    Foreclosures<br><br>• Housing Density<br>    Availability<br>    Occupancy<br>    Vacancies<br>    Owner Occupied Housing Units<br>    Renter Occupied Housing Units |
| | Commercial Real Estate Market Health | • Commercial Real Estate Availability by Property Type and Class<br>    Supply/Demand for Commercial Space<br>    Supply/Demand for Industrial Space<br>    Supply/Demand for Retail Space<br><br>• Lease Rates by property class<br>• Occupancy Rates<br>• Commercial Construction |

Figure 6C: External Local Traffic Data Categories with Representative Attributes

| Internal | External | |
|---|---|---|
| None | Local Traffic | • Traffic Density |
| | | • Vehicle Registrations by vehicle type |
| | | • New Vehicle Sales<br>    by vehicle type<br>    by vehicle make<br>    by vehicle model<br>    by vehicle year<br>    by vehicle size |
| | | • Licensed Drivers<br>    by gender<br>    by age |
| | | • Daily Traffic Patterns<br>    Commuters<br>    Public Transportation |
| | | • Commuting Times |
| | | • Commuting Distances |
| | | • Location of Traffic Generators<br>    Shopping Centers<br>    Transportaton Hubs<br>    Hospitals/medical centers<br>    Entertaiment districts |
| | | • Construction Zones |
| | | • Roadway classifications |
| | | • Roadway elevation changes |
| | | • Speed Limits |
| | Local Traffic Incidents and Accidents | • Traffic Incident Data<br>    Location<br>    Date<br>    Time<br>    Cause |
| | | • Accident Outcomes |
| | | • Accident Fatalities |

Figure 6D: External Local Weather Data Categories with Representative Attributes

| Internal | External | |
|---|---|---|
| None | Land-Based Observations | • Local Observations and Measurements<br>　Hourly (or better) Temperature<br>　Daily Min/Max Temperatures<br>　Hourly (or better) precipitation<br>　Daily Precipitation Totals<br>　Sun Rise<br>　Sun Set<br>　Average Wind Speed<br>　Prevailinig Wind Directiokn<br>　Peak Sustained Wind Speed<br>　Max Wind Gust Speed<br>　Cloud Cover<br>　Visibility<br>　Climate Normals |
| | Satellite Imagery | • Local Imagery and Interpretations<br>　Hourly (or better) cloud cover data<br>　Pollution Monitoring<br>　Humidity<br>　Air Quality<br>　　Surface Smoke<br>　　Surface Dust<br>　　Ozone |
| | Radar Returns | • Local Imagery and Interpretations<br>　Wind Speed<br>　Wind Direction<br>　Precipitation Totals<br>　Precipitation Rate |

Figure 6E: External Localized Severe Weather Categories with Representative Attributes

| Internal | External | |
|---|---|---|
| | Damaging Wind | • Historical Damaging Wind Watch Declarations<br>• Historical Damaging Wind Warning Declarations<br>• Historical Occurrences<br>    Location<br>    Date<br>    Local Intensity<br>    Property Damage / Loss Amount |
| | Hail | • Historical Hail Watch Declarations<br>• Historical Hail Warning Declarations<br>• Historical Occurrences<br>    Location<br>    Date<br>    Local Intensity<br>    Property Damage / Loss Amount |
| | Thunderstorms | • Historical Thunderstorm Watch Declarations<br>• Historical Thunderstorm Warning Declarations<br>• Historical Occurrences<br>    Location<br>    Date<br>    Local Intensity<br>    Property Damage / Loss Amount |
| | Lightning Strikes | • Cloud to Ground Lightning Strike Frequency<br>• Lightning Damage<br>• Lightning Casualties |
| | Winter Weather | • Historical Winter Weather Watch Declarations<br>• Historical Winter Weather Warning Declarations<br>• Historical Occurrences<br>    Location<br>    Date<br>    Local Intensity<br>    Property Damage / Loss Amount |
| | Other Severe Weather Warnings | • Excessive Heat Warnings<br>• Heat Advisory<br>• Gale<br>• Flash Flood<br>• Red Flag Fire Warnings<br>• Storm Surge<br>• Hazardous Seas<br>• Small Craft Advisory<br>• Coastal Flood Advisory |

Figure 6F: External Local Catastrophe Data Categories with Representative Attributes

| Internal | External | |
|---|---|---|
| | Catastrophes and Natural Hazard Events | • Loss Experience<br>    Property Damage<br>    Crop Damage<br>    Injuries<br>    Fatalities |
| | Catastrophes and Natural Hazard Events | • Location<br>• Date<br>• Presidential Disaster Declaration<br>• Global Disaster Identifier<br>• Named Event |
| | Location-Specific Natural Hazard Peril Assessments | • Distance of insured property from:<br>    Flood zones<br>    Hail zones<br>    Tornado zones<br>    Earthquake zones / faults<br>    Brush Fire zones<br>    Landslide zones<br>    Wind Damage<br>    Sinkhole locations<br>    Coastal areas / bodies of water<br>• Distance to nearest fire station<br>• Distance to nearest police station |
| | Earthquake Peril | • Lava Flow Hazard Zones<br>• Tsunami Evacuation Zones<br>• Fault Maps<br>• Earthquake History<br>    Magnitude<br>    Frequency<br>    Property Damage / Loss Amount<br>• Seismic Activity |
| | Wildfire Peril | • Historical Occurrences<br>    Location<br>    Date<br>    Local Intensity<br>    Property Damage / Loss Amount<br>• Presence/amount of available fuel<br>• Slope<br>• Accessibility |
| | Sinkhole Peril | • Sinkhole Locations<br>• Property Damage / Loss Amount |
| | Hurricane / Tropical Storm Peril | • Historical Occurrences<br>    Location<br>    Date<br>    Local Intensity<br>    Property Damage / Loss Amount |
| | Flood Peril | • Flood Zones<br>• Historical Occurrences<br>    Location<br>    Date<br>    Local Intensity<br>    Property Damage / Loss Amount |
| | Tornado / Damaging Wind Peril | • Historical Tornado Watch Declarations<br>• Historical Tornado Warning Declarations<br>• Historical Occurrences<br>    Location<br>    Date<br>    Local Intensity<br>    Property Damage / Loss Amount |

Figure 6G: External Public Health and Safety Data Categories with Representative Attributes

| Internal | External | | |
|---|---|---|---|
| | Public Safety | • | Local Fire Protection Capabilities<br>    Emergency Communication Infrastructure<br>    Water Availability and Locations<br>    Department Size<br>    Firestation Location<br>    Fire Station Service Type |
| | | • | Local Crime<br>    Violent Crime<br>    Burglary<br>    Larceny<br>    Motor Vehicle Theft |
| | Public Health | •<br>•<br>•<br>•<br>• | Drug Use<br>Mortality Data<br>Behavioral Risk factor Data<br>CDC Vital Statistics<br>Opoiod Use / Abuse |

Figure 6H: External Legal and Regulatory Data Categories with Representative Attributes

| Internal | Exernal | |
|---|---|---|
| | State and Local Legal and Regulatory Environment | • Motorcycle Helmet Law adoption and enforcement<br>• Recreational Marijuana adoption<br>• Distracted Driving Law adoption and enforcement<br>• Building Code Data<br>    Local Building Codes<br>    Local Building Code Adoption<br>    Local Building Code Enforcement Practices<br>• Alcohol-related incident data<br>• DUI data<br>• Speed camera locations<br>• Speed enforcement<br><br>• Attorneys per Capita<br>    Personal Injury attorneys<br>    Other Attorneys |

Figure 6I: External Industry Benchmarking Data Categories with Representative Data Attributes

| Internal | Exernal | |
|---|---|---|
| | Industry Benchmarking | Best's Aggregates and Averages |
| | | Best's Insurance Reports |
| | | Best's State Rate Filing |
| | | Best's Financial Suite |
| | Conning & Company | Insurance Segment Reports |
| | | Forecast & Analysis |
| | | Insurance Trends Report |
| | Council of Insurance Agents & Brokers (CIAB) | CIAB rate change reports |
| | SNL Financial | Rate Filings |
| | ISO | ISO Trends |
| | | ISO Fast Track data |
| | | ISO Underwriting Results AY, PY |
| | Perr & Knight | Rate Filings |

Figure 6J: External Social and Behavioral Data Categories with Representative Attributes

| Internal | External |
|---|---|
| | • Traditional Media Consumption<br>  Platforms<br>  Usage<br>  Daily Household Screentime<br><br>• Social Media Engagement<br>  Accounts<br>  Household profiles<br>  Usage<br><br>• Social Media Monitoring<br><br>• Mobile Phone Usage<br><br>• Life Events<br>  New/Expecting Parents<br>  Marriage/Divorce<br>  New Graduates<br>  New Job/Retiree |

Figure 6K: Internal and External Policyholder Personal Data Categories with Representative Attributes

| Internal | | External |
|---|---|---|
| Personal Attributes | • Name<br>• Social Security Number<br>• Gender<br>• Age<br>• Address<br>• Marital Status<br>• Contact Information and Preferences | |
| Residence | • Residence Type<br>• Own or Rent<br>• Mortgage Holder<br>• Time at current residence<br>• Address History | |
| Occupation | • Occupation<br>• Employment Tenure<br>• Employment History<br>• Education | |
| Household | • Spouse / Partner<br>   Name<br>   Social Security Number<br>   Gender<br>   Age<br>   Address<br><br>   Occupation<br>   Employment Tenure<br>   Employment History<br>   Education<br><br>• Number, Ages, and Gender of children<br>• Number of Drivers in Household<br><br>• Household Reported Licensed Driver Data<br>   Drivers' License numbers<br>   License type<br>   License restrictions<br>   Known Impairments<br>   Issuing State<br>   Expiration Date<br>   Years as a licensed driver<br><br>   Driver Training/Improvement Classes - attendance and dates | • Identification of Undisclosed Household Drivers |

Figure 6L: Internal and External Policyholder and Household Financial Position Data Categories with Representative Attributes

| Internal | | External | |
|---|---|---|---|
| Financial Position | • Total Reported Household Income<br>• Policy Billing History | Consumer Financial Data | • Household Income Verification<br>• 3-Bureau Credit scores<br>• 3-Bureau Credit Reports<br>• Employment Verification<br>• Earnings History<br>• Bankruptcy<br>• Financial Account Data<br>    Investment Accounts / Balances<br>    Savings Accounts / Balances<br>    Cash / Cash Equivalents<br>    Revolving credit accounts<br>    Revolving credit payment history<br>• Outstanding consumer debt balances and repayment schedules<br>    Mortgage(s<br>    Auto Loans<br>    Student Loans<br>    Home equity loans<br>    Other consumer credit lines<br>• Transaction History and Trends<br>    Purchase History and Locations<br>    Loyalty Card Transactions<br>    Spending Changes<br>    Coupon usage |

Figure 6M: Internal and External Insured Assets – Vehicles Data Categories with Representative Attributes

Internal

- Vehicle Identification Number (VIN)
- Vehicle Manufacturer
- Vehicle Model
- Year
- Vehicle Type
  - Private Passenger Auto
  - Commercial Vehicle
  - Motorhome/Recreational Vehicle
  - Watercraft
  - Other
- Vehicle Body Type
- Vehicle Dimensions
  - Gross Vehicle Weight
  - Number of Doors
  - Bumper Height
- Vehicle Performance
  - Number of cylinders/displacement
  - Horsepower
  - Acceleration times
  - Braking times
- Vehicle Safety Features
  - Driver and Passenger Restraint Systems
  - Number of Airbags
  - Driver Assist Systems
    - Lane Keeping Assistance/Warning
    - Blindspot Warning
    - Collision Warning
    - Collision Avoidance
    - Adaptive Cruise Control
  - Antilock Brakes
  - Daytime Running Lights
- Anti-Theft System
- Onboard Diagnostic Device
- Cost New
- Aftermarket Additions / Modifications
- Ownership
  - Owned
  - Leased
    - Lease Term
    - Term Expiration
    - Monthly Payments
  - Financed
    - Monthly Payments
    - Payments Remaining
- Intended Vehicle Use
- Estimated Annual Miles Driven
- Daily commuting miles
- Vehicle Daytime Location
- Vehicle Overnight Location
- Vehicle Usage Data
  - Trip-level data - loctions, times, dates, distances traveled
  - Hard braking events
  - Average and max speeds

External

- Vehicle History Reports - inspection, collision, repair, etc
  - Inspection Dates and Outcomes
  - Collisions
  - Repairs
  - Maintenance History
- Mileage history
- Vehicle Safety Ratings
- Vehicle Crash Test Ratings
- Theft rates
- Industry-Wide Claim Frequency and Severity
  - by vehicle type
  - by vehicle make
  - by vehicle model
  - by vehicle year
  - by coverage
  - by zip code (or better)
  - by zise of loss
  - by amount of insurance
  - by cause of loss Figure 6N: Internal and External Insured Assets – Home Data Categories with Representative Attributes

| Internal | External |
|---|---|
| <ul><li>Dwelling Attributes</li><li>Construction Year</li><li>Structure Type<br>   Total Living Area (square feet)<br>   Number of stories<br>   Room count<br>   Chimney count<br>   Bathroom count<br>   Bedroom count</li><li>Construction Type</li><li>Foundation type</li><li>Construction Quality Rating<br>   Building Material - Foundation, frame, exterior walls, roof<br>   Roof Type</li><li>Water Source</li><li>Electric Power Source</li><li>HVAC<br>   Central Heating / Air?<br>   Number of Air Conditioning Units<br>   Primary Heating System Type<br>   Secondary Heating System Type</li><li>Time since updates to:<br>   Plumbing<br>   Electrical<br>   Primary Heating System<br>   Secondary Heating System<br>   Windows<br>   Roof<br>   Septic System</li><li>Home Safety Features<br>   Fire Alarm - type and description<br>   Sprinkler system installed?<br>   Smoke Detectors - type, number, and description<br>   Fire Extinguishers - type and number<br>   Burglar Alarm - type and description</li><li>Gate/Controlled Access?</li><li>Presence on Premise of:<br>   Pool<br>   Animals<br>      Number<br>      Type<br>      Breed<br>      Size<br>      Bite History<br>   Trampoline/skateboard ramp<br>   Other External Structures</li><li>Residence Type<br>   Primary<br>   Secondary<br>   Seasonal</li><li>Days Occupied</li><li>Owner occupied?</li><li>Number of families in residence</li><li>Occupant Count</li><li>Size of property in acres</li><li>Elevation above sea level</li><li>Slope</li><li>Assessed Tax Value</li><li>Replacement Cost</li><li>Location Assessment<br>   Distance to nearest fire station<br>   Distance to nearest police station<br>   Total number of policyholders insured within a 1/3/5/10 mile radius<br>   Total dollar value of assets insured within a 1/3/5/10 mile radius<br>   Total number of policyholders in Zip code<br>   Total number of policyholders in MSA<br>   Total number of policyholders in County<br>   Total dollar value of assets insured in Zip code<br>   Total dollar value of assets insured in MSA<br>   Total dollar value of assets insured in County</li></ul> | <ul><li>Location-Specific Natural Hazard Peril Assessment<br>   Distance of insured property from:<br>      Flood zones<br>      Hail zones<br>      Tornado zones<br>      Earthquake zones / faults<br>      Brush Fire zones<br>      Landslide zones<br>      Wind Damage<br>      Sinkhole locations<br>      Coastal areas / bodies of water</li></ul> |

Figure 6O: Internal Policyholder-Carrier Interaction Data Categories with Representative Attributes

| Internal | | External |
|---|---|---|
| General | • Customer Tenure<br>• Products Owned<br>• Customer Lifetime Value | |
| Policy | • Policy Type<br>    Auto<br>    Home<br>    Landlord<br>    Renter<br>    Other<br><br>• Policy Term<br>• Policy Effective Date<br>• Times Renewed<br>• Continuous Coverage?<br>• Prior lapse on record?<br>• Length of Lapse<br>• Deductible<br>• State Minimum Coverage Amount? | |
| Policy Coverages | Personal Lines<br><br>• Auto / Vehicle Coverages and Coverage Amounts<br>    Collision<br>    Comprehensive<br>    Underinsured Motorist<br>    Uninsured Motorist<br>    Medical Payments<br>    Liability<br>    Personal Injury Protection<br>    Other<br><br>• Homeowners Coverages and Coverage Amounts<br>    Homeowner - Property<br>    Homeowner - Liability<br>    Landlord - Property<br>    Landlord - Liability<br>    Renter<br><br>• Commercial Auto Coverages and Coverage Amounts<br>• Commercial Property Coverages and Coverage Amounts<br>• Other<br><br>• Optional Coverages<br>    Home Contents<br>    Vehicle Contents<br>    Home Electronics<br>    Jewelry<br>    Tools<br>    Art<br>    Musical Instruments<br>    Other | |
| Customer Acquisition | • Channel<br>    Direct<br>    Independent Agent<br>    Captive Agent<br>    Group<br><br>• Producer<br>    Agent / Agency Name<br>    Location / Region<br>    Hierarchy<br>    Commission Structure | |
| Customer Relationship | • Customer - Carrier Interactions<br>    Contact Center - inbound and outbound<br>    CRM<br>    Call Center Representative written notes and comments<br>    Call Recordings<br>    Chat logs<br><br>    Outbound Marketing / Communications | |

Figure 6P: Internal Claim History Data Categories with Representative Categories

| Internal | External |
|---|---|
| • Claim Count - Primary Insured and Household<br>    Type<br>    Date<br>    Disposition<br><br>• Claim History and Disposition - Primary Insured and Household<br>    Claim Type<br>    Loss Date and time<br>    Loss Location<br>    Loss Description<br>    Weather at time of incident<br>    Claim Creation Date<br>    Attorney Representation?<br>    Claim Disposition<br>    Incurred Loss Amount<br>    Liability Percent<br>    Salvage and Subrogation<br>    Police Report Filed?<br><br>• Prior Carrier History<br>    Prior Carrier Name<br>    Prior Carrier AM Best Code<br>    Prior Carrier NAIC Code<br>    Customer Tenure with Prior Carrier<br>    Prior Claims Filed?<br>      Type<br>      Date<br>      Disposition | |

Figure 6Q: Internal Driving History Data Categories with Representative Attributes

| Internal | External |
|---|---|
| • Traffic Incident History - Primary Insured and Licensed Household Members<br>　　Major violations<br>　　Minor violations<br>　　At-fault accidents<br>　　Not-at-Fault accidents<br>　　DUI<br>　　Towing<br>　　Glass<br>　　License Suspension<br>　　Theft/Vandalism<br>　　Bodily Injury<br>　　Other<br><br>• Home or Homeowner<br>　　Liability Claims against homeowner<br>　　History of Losses due to natural causes<br>　　Theft Loss<br>　　Fire Loss<br>　　Other<br><br>• Other Policy/Coverage Types<br><br>• Incident Date<br>• Incident Disposition | |

OVERVIEW
CLAIMS
PLAINTIFF ATTORNEYS
DEFENSE ATTORNEYS

[LIKELIHOOD OF SUIT ▾] [ALL COVERAGES ▾] [CONFIDENCE ▾] [COST ▾] [TIMES ▾] [TABLE] [MAP]

ONLY YOUR PENDING CLAIMS

| DEF ATTY | PROJ IND CONFIDENCE | PROJ DAYS OF SUIT | SUIT LIKELY | ACT LIT EXP | PROJ LIT CONFIDENCE | STATE |
|---|---|---|---|---|---|---|
| | $0 73% | 638 DAYS | IN SUIT | $689 | $3,391 -- | NY |
| | $0 79% | 812 DAYS | IN SUIT | $5,421 | $7,071 -- | NY |
| | $34,271 67% | 705 DAYS | IN SUIT | $1,435 | $3,038 -- | NY |
| | $26,290 80% | 262 DAYS | IN SUIT | $0 | $5,611 -- | NJ |
| | $28,644 -- | 362 DAYS | IN SUIT | $0 | $2,029 -- | NY |

ROWS PER PAGE: [10 ▾]   1-10 OF 65   ∧ ∨

*FIG. 12*

DATABASE MANAGEMENT SYSTEM FOR MERGING DATA INTO A DATABASE

CROSS-REFERENCE TO RELATED APPLICATIONS

This application claims priority under 35 U.S.C. § 119(e) to U.S. Provisional Patent Application No. 62/564,468, filed on Sep. 28, 2017, which is hereby incorporated by reference in its entirety.

FIELD OF THE INVENTION

The present application relates to computing technologies, machine learning technologies, database searching technologies, and more particularly, to a database management system for merging data into a database.

BACKGROUND

A database may be a collection of information that may be specially organized for search and retrieval by a database management system. However, these traditional databases, and the traditional methods for adding information to these databases, may be deficient.

SUMMARY

According to one example, a system includes a memory that stores instructions, and a processor that executes the instructions to perform operations. In doing so, the processor may fetch a set of data from a data source external to a database. The processor may further determine that the fetched set of data is unstructured data, and transform the fetched set of data into structured data. The processor may also determine one or more lowest denominators for the fetched set of data. The one or more lowest denominators may include one or more of a spatial denominator and a temporal denominator. The processor may further determine that the fetched set of data does not meet the one or more lowest denominators, and transform the fetched set of data to meet the one or more lowest denominators. The processor may also determine one or more joinable keys for the fetched set of data, where the one or more joinable keys may provide a connection to a set of data stored in the database. The processor may also merge the fetched set of data into the database with the set of data stored in the database.

BRIEF DESCRIPTION OF THE DRAWINGS

FIGS. 6A-6Q provide additional information regarding example data.

FIG. 12 illustrates an example of the graphical user interface that may allow a user to better interact with the model(s).

DETAILED DESCRIPTION OF THE INVENTION

Embodiments of the present disclosure are best understood by referring to FIGS. 1-14C of the drawings, like numerals being used for like and corresponding parts of the various drawings.

Figure 1:
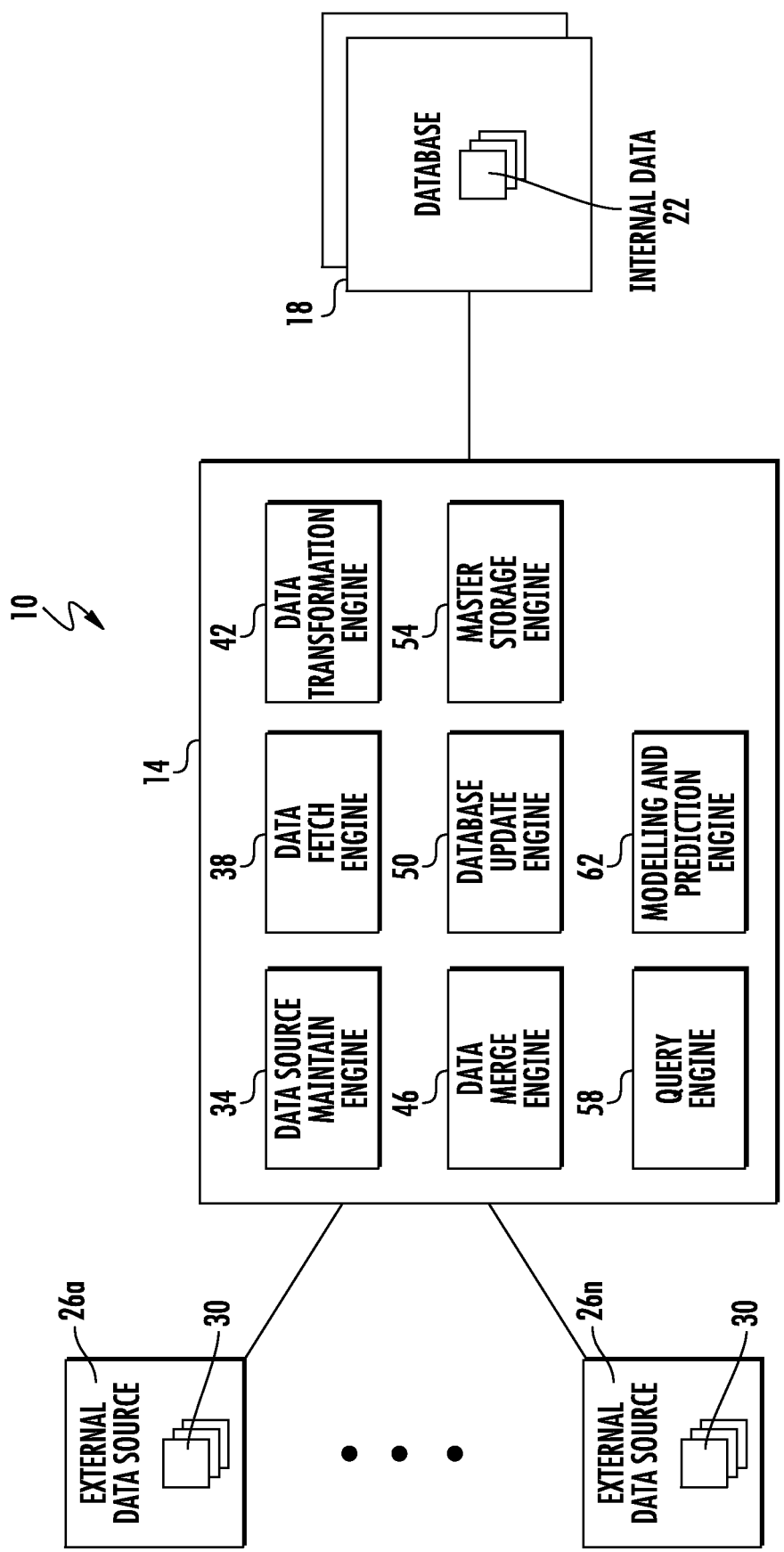
FIG. 1 is a schematic illustration of one example of a database system.

FIG. 1 is a schematic illustration of one example of a database system 10. As is illustrated, the database system 10 may include a database management system 14, one or more databases 18 storing internal data 22, and one or more external data sources 26 storing external data 30. According to one example, the database management system 14 may retrieve external data 30 from the external data source(s) 26, transform the external data 30 into a format compatible with the database 18 and/or the internal data 22, and then merge the external data 30 into the database 18 with the internal data 22.

Traditionally, data that was not compatible with a database and/or compatible with the data already stored in the database, could not be added to the database in any meaningful manner. For example, even if a video file could be added to a database having textual variables, in some circumstances, it could not be connected to those textual variables. As such, subsequent queries to the database could not retrieve all of the relevant information, leaving an incomplete picture of the data. In contrast to this, in some examples, database management system 14 may transform this incompatible data so that it can be merged into a database in a more meaningful manner. Not only may this allow for better search results within the database, but it may also increase the speed of search and retrieval within the database. For example, because the data may be transformed into a format that is compatible with the database (and also because the data may further be transformed to meet the lowest denominator), the database may not experience lag while attempting to parse through incompatible data. Instead, the data may all be stored in a more easily searchable format, allowing the database to more quickly retrieve the data, and to retrieve the data with less error (e.g., missing information, error messages, etc.). Additionally, in some examples, the retrieved data may be more accurately modelled (using one or more machine-learning techniques to better select and train the models), allowing for more accurate predictions using the retrieved data.

As is illustrated in FIG. 1, the database system 10 includes the database management system 14, which may interact with external data sources 26 and database 18 in order to add data to the database 18, and also to search for data within the database 18. The database management system 14 may be software, hardware, or a combination of the preceding. One example of the database management system 14 is discussed below with regard to FIG. 4. Database management system 14 may include a data source maintain engine 34, a data fetch engine 38, a data transformation engine 42, a data merge engine 46, a database update engine 50, a master storage engine 54, a query engine 58, and a modelling and prediction engine 62. Furthermore, the database management system 14 may include further engines and components, some of which are discussed further herein.

The data source maintain engine 34 may store the location of the external data sources 26, may store the location of the external data 30 (e.g., FTP, URL, etc.), may store the history of an external data source 26 (and any changes), may store (and update) a constantly-updated repository of the availability of new or updated external data 30, may store a verification of each external data source 26's file path within the system 10, or any combination of the preceding.

The data fetch engine 38 may retrieve the most recent (i.e., most up-to-date) set of the external data 30 from the external data source 26, may ensure that the external data 30 retrieved from a particular external data source 26 is the most up-to-date version of the data, or any combination of the preceding.

The data transformation engine 42 may transform external data 30 to be compatible with the database(s) 18 and/or the internal data 22 stored in the database(s) 18. Examples of this transformation are discussed in detail below. This transformation may ensure that the fetched external data 30 may be merged (e.g., combined, joined, aggregated, etc.) into the database(s) 18, merged with the internal data 22 in the databases 18, and/or merged with other fetched external data 30.

The data merge engine 46 may merge the external data 30 into the database(s) 18 with the internal data 22 to create a "master" database dataset. This merge may be performed based on set of rules (both specified and auto-generated). Also, it may join all internal and external data 22, 30 into a master database dataset on the most granular level available, both spatially and temporally, in some examples. Examples of this merging of external data 30 are discussed in detail below.

The database update engine 50 may merge all of the different versions of the master database datasets together to keep the database(s) 18 updated. This merging of the different versions may occur continuously, periodically (e.g., every minute, every hour, every day), on demand (e.g., when instructed by a user of database management system 14), or any combination of the preceding. The master storage engine 54 may store, maintain, encrypt, back-up, roll-over the database 18 (e.g., the master database dataset in the database 18), or any combination of the preceding.

The query engine 58 may query the database(s) 18 for data. This may allow data to be retrieved from the database(s) 18 for use by the user (e.g., for viewing by a user, to use for making predictions via the modelling and prediction engine 62). The modelling and prediction engine 62 may select one or more models for making a prediction, may train the models, and may produce a prediction (or solution) using a dataset retrieved from the database(s) 18.

As is illustrated in FIG. 1, database system 10 may include one or more databases 18. A database 18 may refer to a collection of information that may be specially organized for search and retrieval by the database management system 14. The database 18 may be stored as a set of files on, for example, magnetic disk or tape, optical disk, or some other secondary storage device. The information in these files may be broken down into records, each of which may consist of one or more fields. The database 18 may be any type of database. For example, the database 18 may be a relational database (e.g., Oracle database, MySQL, Microsoft SQL Server, PostgreSQL, DB2, etc.), or a non-relational database/NoSQL database (e.g., Redis, Amazon DynamoDB, etc.). Database system 10 may include any number of databases 18. Furthermore, the database 18 may be a distributed database.

The database 18 may be connected to the database management system 14 over a communication network (e.g., all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the components). This may allow the database management system 14 to communicate with the database(s) 18 to merge data into the database(s) 18, and to retrieve data.

Database 18 may store internal data 22. Internal data 22 refers to internally collected data. For example, the database 18 may be a database utilized by an oil production company (e.g., Halliburton, Baker Hughes). In such an example, the internal data 22 may be data that was internally collected by the oil production company (e.g., data collected by Halliburton). For example, it may include production results for a particular oil well, a particular oil field, etc. In some examples, the internal data 22 may be been input (manually or automatically) into the database 18 by an employee of the company. Although internal data 22 is described above (and herein) as being data associated with oil production, the internal data 22 may be any other data, such as data associated with any other technology or field (e.g., engineering fields, construction fields, legal field, medical field, educational field, insurance field, etc.).

In some examples, the internal data 22 may be structured data. This structured data may be highly organized data residing in a fixed field within a record or file, such as data contained in relational databases and spreadsheets. As examples, the structured data may be defined by a row/column that organizes the data, a table, semi text (e.g., XML), and/or pre-defined formats.

As is also illustrated in FIG. 1, database system 10 may include one or more external data sources 26 (e.g., external data sources 26a-26n). An external data source 26 may refer to a source of externally collected data. For example, when the database 18 is utilized by an oil production company (e.g., Halliburton), the external data source 26 may be a source of data that is collected by any other company, person, or entity that is not Halliburton and/or that is not affiliated with Halliburton. In such an example, the external data source 26 may be an external website, a newspaper, an external oil production management team, a library, a school, or any other company, person, or entity that is not Halliburton. The external data source 26 may be a computing system (e.g., a computer, a server, a phone), a database, a cache of audio files, any other piece of hardware and/or software that stores data, or any combination of the preceding.

The external data source 26 may be connected to the database management system 14 over a communication network (e.g., all or a portion of the PSTN, a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the components). This may allow the database management system 14 to communicate with the external data source 26 to fetch data.

The external data source 26 may store (or otherwise have) external data 30. External data 30 refers to externally collected data. For example, when the database 18 is utilized by an oil production company (e.g., Halliburton, Baker Hughes), the external data 30 may be data that was collected by any other company, person, or entity that is not Halliburton and/or that is not affiliated with Halliburton. For example, it may include production results for a particular Baker Hughes oil well, a particular Baker Hughes oil field, etc. As another example, it may include photographs or a video feed of drilling/fracking being performed by a different oil production company. Although external data 30 is described above (and herein) as being data associated with oil production, the external data 30 may be any other data, such as data associated with any other technology or field (e.g., engineering fields, construction fields, legal field, medical field, educational field, insurance field, etc.).

In some examples, the external data 30 may be structured data. In other examples, the external data 30 may be unstructured data (or semi-structured data). This unstructured data may be information that either does not have a pre-defined data model or that is not organized in a pre-defined manner. Examples of unstructured data include images (e.g., images of an oil field), videos (e.g., videos of a drilling procedure, drilling set-up), written or typed text (e.g., notes from a visit to an oil field, production records for an oil field), audio files (e.g., audio notes from a visit to an oil field, audio presentation on drilling techniques). Because the external data 30 is unstructured (or semi-structured), it may usually not be compatible with the database 18 (which typically utilizes structured data). As is discussed below, this external data 30 may be transformed so that it may be merged into the database 18.

In some examples, the external data 30 may be collected, aggregated, and reported by the external data source 26 as data and data attributes in different ways, at different cadences, at different levels of detail, for different geographies, and in different formats. This may result in the external data 30 having a different granularity than the internal data 22 stored in the database 18, as is discussed below.

Modifications, additions, or omissions may be made to database system 10 without departing from the scope of the disclosure. Furthermore, one or more components of database system 10 may be separated, combined, and/or eliminated. Additionally, the database management system 14 may have less (or more) components and/or engines. Furthermore, one or more actions performed by a component/engine of the database management system 14 may be described herein as being performed by the database management system 14. In such an example, the database management system 14 may be using that particular component/engine to perform the action.

Figure 2:
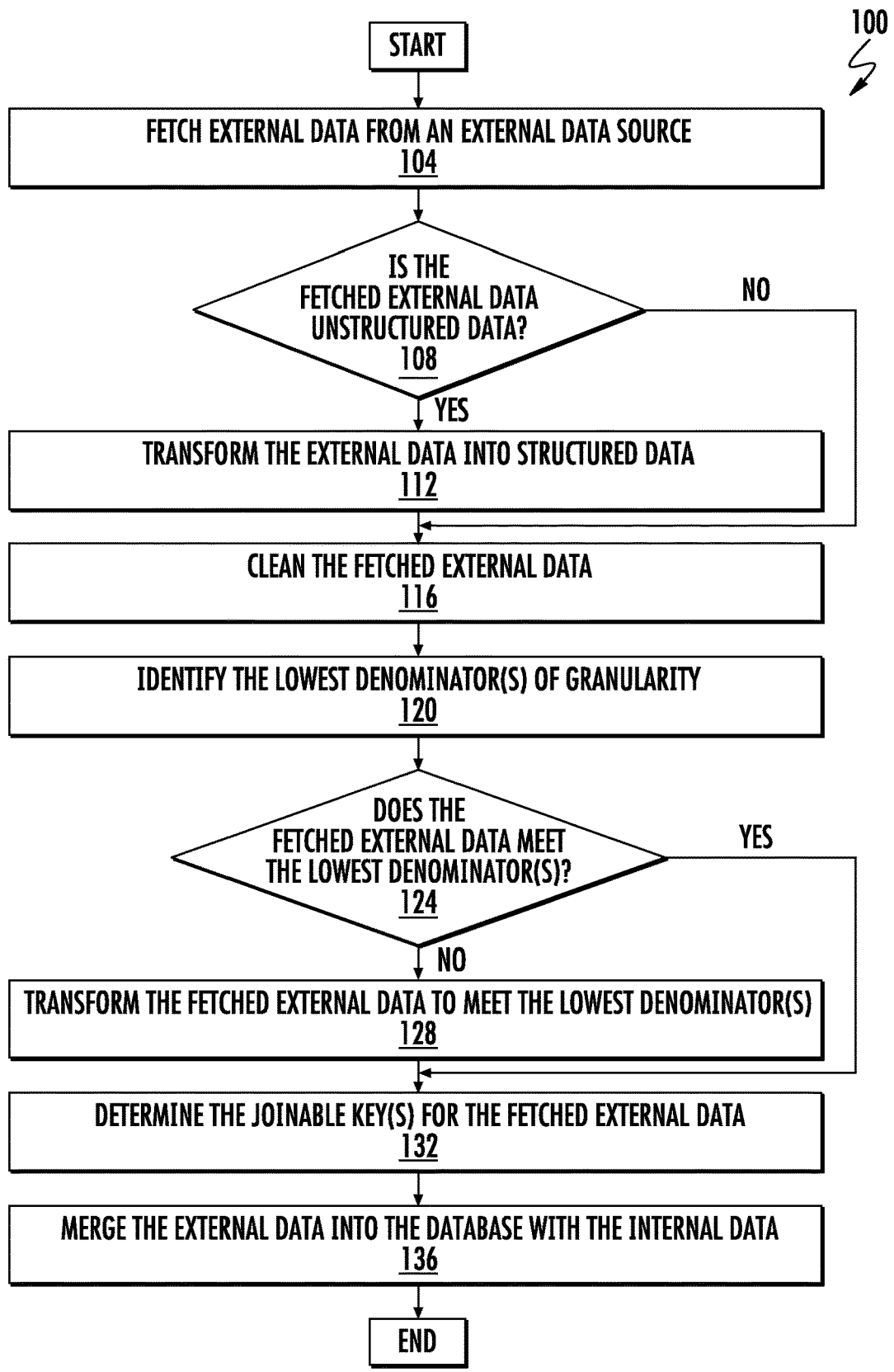
FIG. 2 illustrates an example method for merging data into a database of FIG. 1.

FIG. 2 illustrates an example method 100 for merging data into a database. The method 100 may be performed by database management system 14 of FIG. 1. Furthermore, the method 100 may allow external data 30 to be merged into database 18 of FIG. 1, so as to create (or update) a master database dataset.

At step 104, the database management system 14 (utilizing data fetch engine 38, for example) may fetch external data 30 from an external data source 26. Any amount of external data 30 may be fetched. Furthermore, external data 30 may be fetched from any number of the external data sources 26. The external data 30 may be fetched in any manner. For example, the database management system 14 may query the external data source 26 for the external data 30 (e.g., the external data source 26 may be an external database that may be queried), the database management system 14 may access the external data source 26 (e.g., via a URL) and download the external data 100, an employee may manually enter or automatically enter (e.g., scan, download) the external data 30 received from an external data source 26 (e.g., the employee may upload a video file received from an oil production manager), or any combination of the preceding. The external data 30 may be fetched for any reason. For example, the database management system 14 may fetch the external data 30 continuously, periodically (e.g., every minute, every hour, every day), on demand (e.g., when instructed by a user of database management system 14), when the database management system 14 determines that previous external data 30 is no longer current, or any combination of the preceding.

At step 108, the database management system 14 may determine if the fetched external data 30 is unstructured data. To determine whether the external data 30 is unstructured data, the database management system 14 may identify the external data 30. This identification may occur in any manner. For example, the database management system 14 may analyze the external data 30 (or its metadata) to determine whether it an image, video, audio, text, or pdf. In some examples, the database management system 14 may utilize one or more pre-defined rules to identify (or recognize) the external data 30. Such rules may include utilizing a schema from the tables in the database 18 to automatically detect the type of external data 30, utilizing one or more definitions included in the external data 30 and/or the external data source 26, utilizing a manual data dictionary included in an external data source 26, utilizing a manual input from a user (e.g., the database management system 14 may provide an interface, such as a graphic or format interface, that may be filled in (or clicked on) by a user of the database system 10), or any combination of the preceding.

If the external data 30 is determined to be structured data, the database management system 14 may then move to step 116, where the structured external data 30 is cleaned. On the other hand, if the external data 30 is determined to be unstructured data, the database management system 14 may move to step 112, where it may transform the external data 30 into structured data. The external data 30 may be transformed into structured data based on the external data source 26 from which the external data 30 was fetched. For example, the database management system 14 may maintain an up-to-date schema for each external data source 26. The schema may include the path where external data 30 is fetched, the time stamp of the external data 30, the type of the external data 30 (e.g., structured or unstructured), the useful variables to be extracted from each external data 30, the granularity of the external data 30 (e.g., spatial granularity, temporal granularity), basic transformation rules for transforming the external data 30 to different granularities and/or to structured data, the relationship among external data 30 of the external data source 26 and/or among data sources 26, any other information about the external data 30 and/or the external data source 26, or any combination of the preceding.

In some examples, the database management system 14 may define the schema for each set of external data 30 of the external data source 26. In some examples, the schema may be auto extracted from the external data 30 or pre-defined in a format the database management system 14 can read.

Additionally, the database management system 14 may provide a user interface (e.g., to the user) to allow fields of a schema to be defined (e.g., external data 30 is updated in source or a new external data source 26 is added to the database system 10).

The schema may identify variables included in the external data 30 and may further identify one or more transformation rules for transforming the external data 30. These transformation rules may be applied to the external data 30 to extract the variables from external data 30 (once the external data 30 is recognized and the corresponding schema is applied). As an example of this, the external data 30 may be a video of a drilling set up in a particular geographic location. In such an example, the database management system 14 may confirm that the external data 30 is in the format of a video, may confirm that the external data 30 is from a particular external data source 26 that includes drilling videos (e.g., a website with drilling videos), may identify the schema for that particular external data source 30, may fetch one or more defined variables from the identified schema, and may, based on the schema, perform one or transformation rules (e.g., image processing algorithms, video analysis algorithms, machine learning algorithms, signal processing algorithms, natural language processing, deep learning, and operational research) to extract the values for the variables from the video, or any combination of the preceding. For example, the database management system 14 may perform one or more video analysis algorithms to extract the date of the video (e.g., from metadata), the geographic location of the video (e.g., GPS coordinates), the type of drilling equipment, any other information, or any combination of the preceding. These extracted variables may then be or create the structured data that may be merged into the database 18. Following this transformation of the external data 30, the method may move to step to 116.

At step 116, the structured external data 30 may be cleaned. To clean the structured external data 30, the external data 30 may first be identified (if it is not already identified at steps 104-112). To identify and clean the structured external data 30, the database management system 14 may maintain and update schemas and/or rules for each of the external data sources 26. If some external data 30 is from database tables, the database management system 14 may automatically detect the schema of the datasets. If there is some new external data source 26 that is not defined in the database management system 14 or database 18, the database management system 14 may provide an interface to a user, allowing the user to define the rules. The database management system 14 may then parse these rules, allowing it to identify and process the external data 30.

Following identification of the external data 30, the database management system 14 may utilize the schema/rules to clean the external data 30. For example, the schema/rules may define various irrelevant fields contained in the external data 30. These fields may be pre-filtered out.

Following the cleaning of the external data 30, the method 100 may move to step 120, where the lowest denominator of granularity is identified. Granularity may refer to the scale or level of information included in the external data 30. For example, production results for an oil production company may be production results for an entire oil field (spatial granularity) for an entire month (temporal granularity). In some examples, such granularity may not be compatible with the database 18 or the internal data 22 included in the database 18. As an example, the internal production results included in the database 18 may be per oil well (not oil field) and may be per day (not month). The database management system 14 may maintain a wide range of schemas to define the lowest denominator per the given purpose. Also, the database management system 14 may maintain a schema for each internal data 22, external data source 26, and/or external data 30. The database management system 14 may look up the schema for the external data 30 in order to automatically determine the lowest granularity of the external data 30. For example, based on the schema, the lowest denominator for production of oil in an oil field may be the identity of a particular oil well. This may allow all production information to be collected and associated with that particular oil well. As another example, the lowest denominator in the insurance field may be the identity of the holder of an insurance policy. This may allow all information about the policy (e.g., current claims, current rates) to be collected and associated with the holder of the policy. Also, the lowest denominator may be based on the internal data 22 included in the database 18. For example, if the lowest denominator of the internal data 22 is the identity of a particular oil field, this identity may be determined to be the lowest denominator.

In some examples, there may be two sets (or more) of lowest denominators. The first may be for spatial granularity (e.g., a location of an oil well or field, such as latitude and longitude) and the second may be for temporal granularity (e.g., a time associated with the oil well, such as day or night, a 12 hour period, a 24-hour period, monthly, quarterly or annually). In the insurance field, the spatial granularity may be where the policyholder lives (e.g., coordinates (such as latitude and longitude), zip code, MSA level, county level, state level, etc.), where the policyholder works (e.g., coordinates (such as latitude and longitude), zip code, MSA level, county level, state level, etc.), and/or where an incident or accident involving the policyholder occurs (e.g., coordinates (such as latitude and longitude), MSA level—which may be the default lowest denominator in some examples, but which also may be changeable). Also, in the insurance field, the temporal granularity may be when a policyholder starts to live at one place (e.g., so that the variables that are collected with a timestamp can be associated to the policyholder), when a policyholder starts to work at one place, when an incident or accident happens (e.g., the time, such as 7:30 PM, or the date—which may be the default lowest denominator in some examples, but which also may be changeable).

Following the identification of the lowest denominator, the method 100 may move to step 124, where it is determined if the external data 30 meets the lowest denominator. This may be determined in any manner. For example, the database management system 14 may parse the external data 30 to determine whether it meets the lowest denominator, parse one or more fields in the structure of the external data 30 to determine whether it meets the lowest denominator, analyze the schema for the data source 26 or external data 30 to determine whether it meets the lowest denominator, or any combination of the preceding. If the external data 30 meets the lowest denominator, the method 100 may move to step 132, where joinable keys are determined.

On the other hand, if the external data 30 does not meet the lowest denominator, the method 100 may move to step 128, where the external data 30 is further transformed (or reshaped) to meet the lowest denominator. To transform the external data 30 to the lowest denominator, the database management system 14 may parse, allocate, assign, or otherwise categorize the raw values in the external data 30 at daily (or better) intervals and at different levels (MSA or better). This transformation in granularity may be performed using proportional allocation based on other known measurable values, or local observation, measurement, and recording of actual values.

The database management system 14 may utilize the schema (which includes transformation rules) of the external data source 26 and/or the external data 30 to transform the granularity of the external data 30 to meet the lowest denominator. For example, based on the schema and/or transformation rules, the oil production results in the external data 30 (for example) may be transformed to include data that is per oil well (not per oil field) and also transformed to be per day (not per month). Such transformation may be a calculation or estimation, in some examples. For example, the oil production may be divided by the number of wells (based on production percentages, in some example, or based on prior results) and may further be divided by the number of days in the month. The transformation can happen either in spatial dimensions (for example, convert from oil field to oil well, or from state level to MSA/Zip code level) or on temporal variables (for example, from monthly to a particular day), or both.

As another example, in the transportation field, states (e.g., Texas) may collect (as external data 30) a list of overall vehicle types registered within the entire state. The granularity of this data, however, may be reduced to the lowest denominator of zip code within the state. To do so, the proportions of population for each zip code in the state may be calculated and then the vehicle data can be assigned to each zip code by using the same proportion or approximately the same proportion.

As another example, in the weather tracking field, local weather data from NOAA may collected as external data 30 every 15 minutes from each weather station. This weather data may track weather variables, such as precipitations, temperatures, pressures, etc. for multiple nearby zip codes. The granularity of this data, however, may be increased from every 15 minutes to a 24 hour period (for a particular zip code) by aggregating the weather variables based on the rules in the schema. Alternatively, the granularity of this data may be decreased to a particular time (e.g., 7:12 on Jan. 3, 2018) for a particular zip code.

Following transformation of the granularity of the external data 30, the method 100 may move to step 132, where joinable keys are determined for the external data 30. In some examples, steps 104-128 may be repeated for multiple sets of external data 30. This may allow multiple sets of external data 30 to be merged into the database 18 with the internal data 22.

At step 132, one or more joinable keys may be determined for the external data 30 (or for multiple sets of external data 30). A joinable key may refer to data that connects all of the data to be merged together. For example, a joinable key may be a particular date that connects various sets of data, a particular location that connects various sets of data, a particular identity that connects various sets of data, or any combination of the preceding. As an example of this, both the external data 30 and the internal data 22 may include data (e.g., production data) for a particular oil well. In such an example, the identity of the particular oil well may be the joinable key that connects the external data 30 to the internal data 20, allowing it to be joined together (or otherwise connected) within the database 18.

In some examples, the joinable key(s) may be data columns from each dataset that can connect the two datasets (or tables within the datasets) as one meaningful dataset. For example, there are two datasets (e.g., a dataset of internal data 22 and a dataset of external data 30) to be joined: one is the production dataset for an oil well (which describes oil production for that oil well) and the other is the equipment dataset for the oil well (which describes the type of equipment used in the oil well, the type of fracking parameters used in the oil well, etc.). In this example, the identity of the oil well (e.g., name of the oil well, oil well number) is the joinable key that connects these two datasets. Therefore, this joinable key may be used to join the two datasets into a single master dataset that describes both the oil well's production and equipment.

In another example, in the weather tracking field, there are two datasets (e.g., a dataset of internal data 22 and a dataset of external data 30) to be joined: one is weather data (which describes weather data at a particular time and location), and the other is an incident data (which describes a particular incident at that same particular time and same location, such as the occurrence of a flood, or a fallen tree). In this example, the particular time (e.g., 7:30 PM) and the particular location (e.g., GPS location) are the joinable keys that connect these two datasets. Therefore, these joinable keys may be used to join the two datasets into a single master dataset that describes the weather conditions (e.g., hurricane) and incident details (e.g., flooding) at a particular time and location.

In another example, in the insurance field, there are two datasets (e.g., a dataset of internal data 22 and a dataset of external data 30) to be joined: one is the policyholder dataset that describes the attributes of the policyholder), and the other is the claim dataset (that describes the attributes for each of claim made on the policy owned by the policyholder). In this example, the policyholder ID (e.g., name of the policyholder, policyholder number, customer ID) is the joinable key that connects these two datasets. Therefore, this joinable key may be used to join the two datasets into a single master dataset that describes the policyholder attributes and claims on that policy.

The joinable keys may be determined based on the relationship (or connection) between datasets. For example, the database management system 14 may analyze the schema of the datasets to determine the relationship (e.g., the datasets both deal with a particular oil field). This relationship may be determined using one or more rules included in the schema. Using the determined relationship, the database management system 14 may determine the joinable key(s) that connect the datasets (e.g., the identity of the particular oil field).

Following the determination of the joinable key(s), the method 100 may move to step 136, where the external data 30 is merged into the database 18 with the internal data 22. In some examples, this merging may refer to any manner of adding one or more variables (e.g., a value for each variable) from the external data 30 into the database 18 so that it is logically connected to one or more variables from the internal data 22. For example, when the joinable key is a data column for each dataset (e.g., a column for the identity of a particular oil field), one or more variables from the external data 30 (e.g., production numbers included in the external data) may be added into a data column within the database 18 (e.g., a data column that identifies the particular oil field) that already includes one or more variables from the internal data 22 (e.g., equipment type, fracking details, geographic location, geology details, etc. for that particular oil field). As such, the data column within the database 18 may now include the variables (e.g., the values of the variables) from both the external data 30 and the internal data 22.

As one simple example of all this, an oil production manager may take manual production notes regarding the production at a particular oil well. These notes may be included on a piece of paper. To add this to the database 18, the notes may be scanned, creating a PDF/image of the notes. To turn this into structured data, an image processing method may be applied to PDF/image to convert it into text format. Then, based on a schema, natural language processing (NLP) and pre-defined transformation rules may be used to extract various variables from the note. These variables may include the identity of the oil well (e.g., an identification number), the date of the production numbers (e.g., Jan. 15, 2018), the production amount (e.g., 150 barrels), time for production (e.g., the oil well was operational for 18 hours), etc. These variables may be used to create structured data. Furthermore, using the schema, some of the notes on the image may be disregarded, using a pre-filter to clean the external data. The structured external data (e.g., the variables) may then be used to determine one or more joinable keys. For example, the joinable key may be the identity of the oil well. Using this joinable key, the structured external data may be merged into the database 18 with the internal data 22 (e.g., which includes already stored variables associated with the identity of the particular oil well). As such, the database 18 may now include the variables from both the external data 30 and the internal data 22.

As another example of this, in the insurance field, a car insurance policyholder may be involved in a car accident. This accident may result in a policy report being generated, which identifies the accident using a unique identification number. This unique identification number can be used as a joinable key for adding accident details to the database 18. To get additional information about the accident, a police report may be ordered from the police station. This police report may include various variables, such as the accident description, basic injury description, the liability of the accident, the speed, the driver license information, etc. As is discussed above, this report can be scanned, the variables can be extracted (to create structured data), the joinable key can be identified, and then these variables can be merged into the database 18 with the claim and the insured policyholder by using the joinable key.

Following merging of the external data 30 into the database 18, a query for data may be transmitted to the database 18. The query may be transmitted for any reason. As an example, a user of the database system 10 may desire to access some of the data in the database 18. To do so, the user may utilize an interface (e.g., graphical interface) to input the query. As another example, a software/hardware component (e.g., an application running on a computer or phone) may desire to access some of the data in the database 18. The query may be formed and transmitted in any manner (e.g., SQL).

In response to the query, the database 18 may provide a portion of its stored data for use. For example, if the query is for all information about a particular oil field on a particular date, the database 18 (or another component of the database system 10, such as the database management system 14) may search for and retrieve all of the stored data that satisfies the query (e.g., all of the information about a particular oil field on a particular date). The results of the query may be transmitted for display to the user (e.g., on a graphical user interface). In some examples, the results of the query may be transmitted for use with a model (e.g., the retrieved set of data may be used for modelling to answer a specific predictive question). An example of this use of the query results is discussed below.

Figure 3:
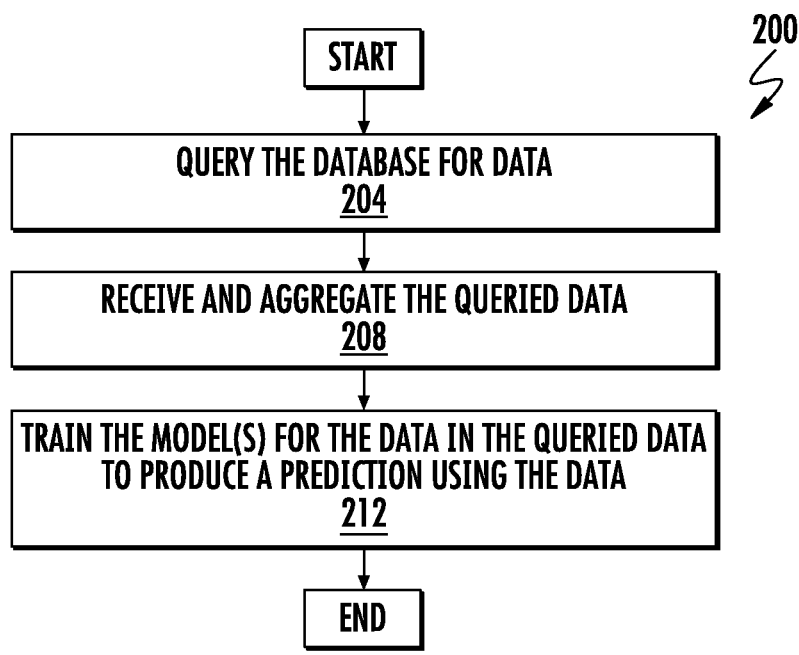
FIG. 3 illustrates an example method for querying the database of FIG. 1 and modelling a solution based on the results of the query.

FIG. 3 illustrates an example method 200 for querying the database 18 and modelling a solution based on the results of a query. The method 200 may be performed by database management system 14 of FIG. 1. The example in FIG. 3 is discussed below in relation to data associated with the insurance field. However, the querying and modelling discussed with regard to FIG. 3 may be used with any other data, such as data associated with oil production, or data associated with any other technology or field (e.g., engineering fields, construction fields, legal field, medical field, educational field, etc.).

At step 204, the database management system 14 (e.g., the query engine 58) may query the database 18 for data. The database management system 14 may query the database 18 in any manner (e.g., SQL query), and for any particular data. In some examples, the database management system 14 may query the database 18 subject to certain conditions (e.g., for a State, such a Virginia, and a type of risk, such as financial risk). The query may be a specific question that is to be solved. For example, to get the ultimate loss prediction for Bodily Injury Liability in each accident in a particular month in 2017. This may cause a set of filters to get the right set of data to be used for a modelling assignment to answer the question.

At step 208, the queried data may be received (e.g., after retrieval by the database 18 and transmission to the database management system 14), and the database management system 14 (e.g., the data transformation engine 42) may aggregate the values for each of the variables from the queried data to match a sought-after granularity. For example, although the database 18 may store particular data at a particular granularity (e.g., the value of the variable is stored at a daily granularity), the query may have requested the data at a different granularity (e.g., the value of the variable at a quarterly or monthly granularity). The granularity of the queried data may be changed in the manner discussed above with regard to FIG. 2.

Also, in the insurance field, a claim may have multiple records in the data stored in the database 18 to represent how the claim has developed over time. As such, multiple values for each attribute of this claim may be tracked. To build a set of data that is suitable for modeling (e.g., modelling ultimate loss), a unique set of values for the variables of this claim may be determined from these multiple records. For an insurance claim, the variables may be, for example, accident information (e.g., when and where an accident happens, the description of the accident, the weather condition, the traffic condition, the injury condition, the vehicles involved in the accident, etc.), policyholder information (e.g., personal information, financial management information, past incident information, etc.), census information (e.g., real estate information, household information, transportation information, law information, economic information, etc.). Also, data like a personal financial management (e.g., credit score) risk assessment varies tremendously over time and therefore the multitude of records must be synchronized with the event in question. This synchronization may be part of the aggregation in step 208.

In another insurance field example, there may be a desire to predict the insured ultimate loss for bodily injury (BI) for each accident month in 2017 for the state of Texas. Since the claims data is not aggregated (in the database 18) on a statewide, nor on a monthly level, many of the variables associated temporally and/or spatially with each claim (e.g., location, weather, personal financial management score, etc.) need to be endogenized into the model via total, average, frequency, etc. This endogenization may be part of the aggregation in step 208.

At step 212, the database management system 14 (e.g., the modelling and prediction engine 62) may train one or more models for each data set in the queried and aggregated data, and may use the model to produce a prediction using the data set. For example, the modelling may allow loss costs to be more accurately calculated using the database 18.

The model(s) to be trained may be one or more models that best fit the dataset, optimizing to a specific loss target. To find this fittest model, the database management system 14 may runs a set of optimization algorithms that can automatically find the architecture and parameters to provide the most fit model or models to produce predictions. The database management system 14 may use any standard metric to evaluate the fit of a model. For example, root square mean error (RMSE) may be used to evaluate the accuracy of the regression model, and the accuracy metric may be used to evaluate the accuracy for a classification model. However, it is not fixed as the evaluation metric can be defined based on a different problem to solve. As an example of this, the fittest model to predict monthly ultimate loss for Bodily Injury in Texas could be generated by using a multiple layer perceptron neural network with a set of specific tuned parameters (e.g., where the parameter can be the number of layers, the number of nodes for each layer, the learning rate, the optimization method, etc.). Alternatively, the fittest model to predict monthly ultimate loss for Bodily Injury in New Jersey may utilize random forest models for optimal fit.

One or more artificial intelligence algorithms may be applied to a dataset to train one or a set of models that are most accurate to produce predictions. To do so, the database management system 14 may utilize a wide range of these artificial intelligence algorithms, including but not limited to regression, decision trees, time series, probabilistic algorithms, neural networks, and many others. The database management system 14 may control the algorithms and pick one or more of the algorithms that can best answer a given question. For each dataset, the database management system 14 may optimize the errors for the model to produce the most accurate predictions.

In some examples, the database management system 14 may include an optional prediction rolling engine (not shown). Typically, models are built on a granular level, such as monthly by zip code; however, some outputs might require quarterly models by state. In such cases, the prediction rolling engine may combine these predictions into a desired (e.g., lesser) level of detail and granularity. The same process can be followed for a number of other applications, including but not limited to: loss curve forecasting, predicting customer conversion, etc., in some examples.

Figure 4:
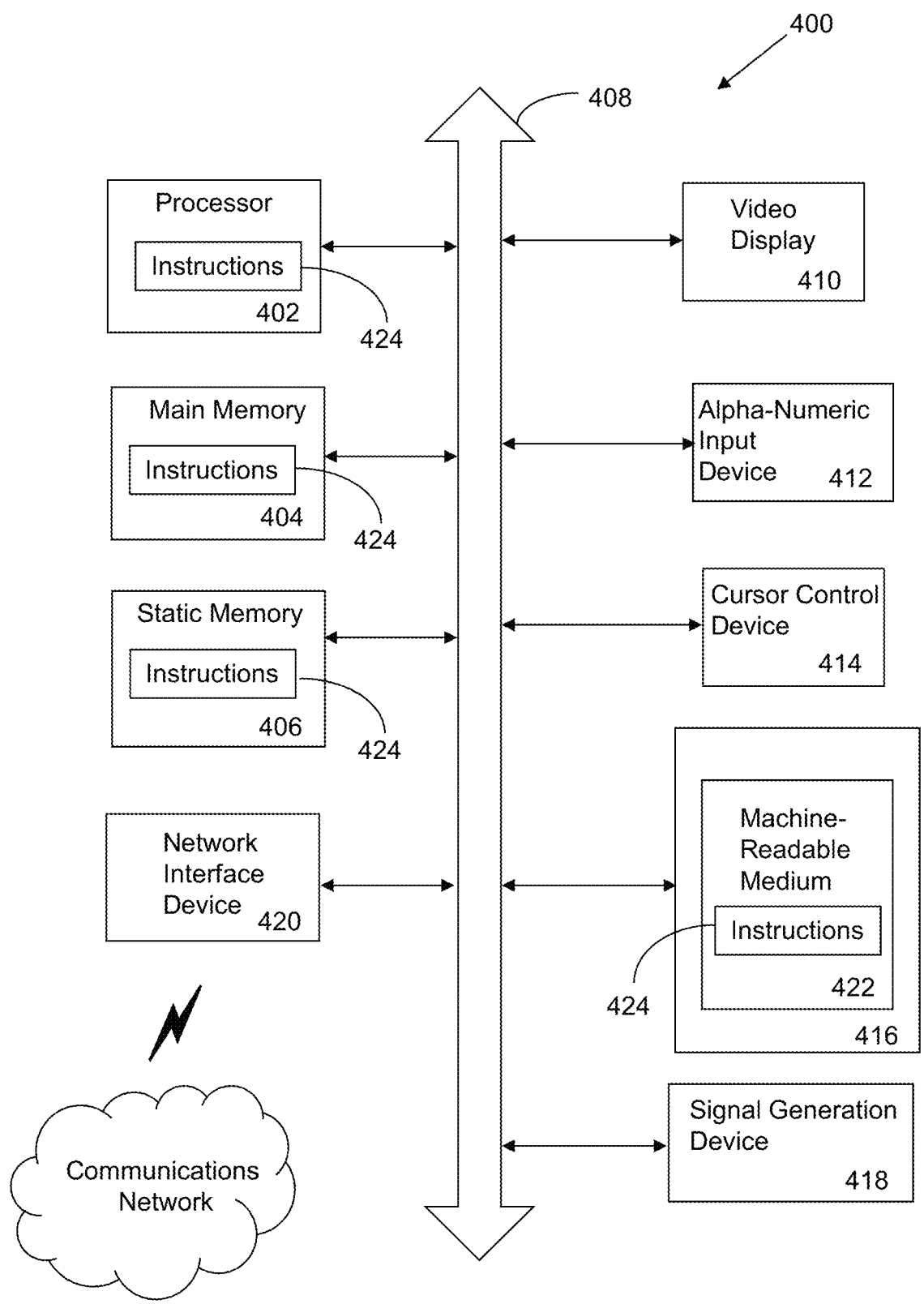
FIG. 4 is a schematic diagram of an example computer system of FIGS. 1-3.

FIG. 4 is a schematic diagram of an example computer system of FIGS. 1-3. At least a portion of the methodologies and techniques described with respect to the exemplary embodiments of the database system 10 may incorporate a machine, such as, but not limited to, computer system 400, or other computing device within which a set of instructions, when executed, may cause the machine to perform any one or more of the methodologies or functions discussed herein. The machine may be configured to facilitate various operations conducted by the database management system 14.

In some examples, the machine may operate as a standalone device. In some examples, the machine may be connected (e.g., using a communications network) to and assist with operations performed by other machines and systems, such as, but not limited to, the database management system 14, the database(s) 18, the external data source(s) 26, or any combination of the preceding. The machine may assist with operations performed by the data source maintain engine 34, the data fetch engine 38, the data transformation engine 42, the data merge engine 46, the database update engine 50, the master storage engine 54, the query engine 58, the modelling and prediction engine 62, any other component in system 10, any programs in system 10, or any combination of the preceding. The machine may be connected with any component in system 10. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU), or both), a main memory 404 and a static memory 406, which communicate with each other via a bus 408. The computer system 400 may further include a video display unit 410, which may be, but is not limited to, a liquid crystal display (LCD), a flat panel, a solid state display, or a cathode ray tube (CRT). The computer system 400 may include an input device 412, such as, but not limited to, a keyboard, a cursor control device 414, such as, but not limited to, a mouse, a disk drive unit 416, a signal generation device 418, such as, but not limited to, a speaker or remote control, and a network interface device 420.

The disk drive unit 416 may include a machine-readable medium 422 on which is stored one or more sets of instructions 424, such as, but not limited to, software embodying any one or more of the methodologies or functions described herein, including those methods illustrated above. The instructions 424 may also reside, completely or at least partially, within the main memory 404, the static memory 406, or within the processor 402, or a combination thereof, during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various examples of the present disclosure, the methods described herein are intended for operation as software programs running on a computer processor. Furthermore, software implementations can include, but not limited to, distributed processing or component/object distributed processing, parallel processing, or virtual machine processing, which can also be constructed to implement the methods described herein.

The present disclosure contemplates a machine-readable medium 422 containing instructions 424 so that a device connected to a communications network can send or receive voice, video or data, and communicate over the communications network using the instructions. The instructions 424 may further be transmitted or received over the communications network via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

As is discussed above, the methods (and systems) discussed herein may be used with any type of data. For example, the methods (and systems) discussed herein may be used with data associated with oil production, or data associated with any other technology or field (e.g., engineering fields, construction fields, legal field, medical field, educational field, insurance field etc.). Additional details regarding the use of these methods (and systems) in the insurance field are included below. These details are provided as an example, and are not limited to the insurance field.

In some examples, the methods (and systems) discussed herein may improve the efficiency and effectiveness in targeting, acquiring, pricing, and servicing customers in the insurance field. In some examples, they may provide for better risk assessment at the aggregate and individual level for businesses of all types, but most especially those with risk-sensitive pricing.

Businesses of all types struggle with targeting and acquiring customers. Marketing dollars are best spent on those prospects likely to convert, and further optimized on prospects who will be good customers once converted. The factors that drive conversion, and determine the desirability of a customer, are driven by a combination of an individual's personal characteristics, environment, relationships, and assets, among a host of other factors. Integrating these variables, automatically, and finding only those relevant to each particular customer, in each particular business, for each particular product, is often very difficult. Combining hundreds of sources of data on an individual, and automatically choosing which are relevant, can help all companies better target prospects who are likely to convert, and therefore more deserving of attention.

In many industries, the production cost is known before a product is sold, and therefore pricing tends to be uniform. For those industries where the ultimate cost is not known prior to sale, there is an additional layer of complexity. This is particularly true in industries where risks/costs ex-ante are not specifically known, like default risk on contracts, wireless phone service, insurance, logistics, banking and lending, power and natural gas utilities, etc. In this case, pricing is often provided contemporaneously, based on estimates from a few data points. For example, insurance rates are determined by actuarial tables which attempt to capture an individual's risk in a few data points. In these industries, automatically integrating all relevant information about a potential customer's assets, environment, and individual characteristics can more precisely assess a prospect's risk, and hence, the price he/she should be offered for a given good or service. Pricing in such industries can support acquiring customers, giving special rates to those customers most desirable and pricing more risk/excluding those undesirable prospects.

Once these customers are acquired, it is important to understand how best to service them. Properly targeted and priced, many customers still need special attention. For example, customers who were noted as a higher default risk in their power contracts might be priced higher, but a company needs to know what individualized warning signs to look out for that might portend default risk or delayed payment of a bill. This is particularly true in jurisdictions where denying service is not an option (for example, natural gas companies in the northern U.S. cannot cut off gas for non-payment of bills in the winter as it has been deemed a health hazard). In insurance, customers who file claims can be meaningfully differentiated in their claims experience based upon risk of fraudulent claims or excessive padding of expenses.

Figure 5:
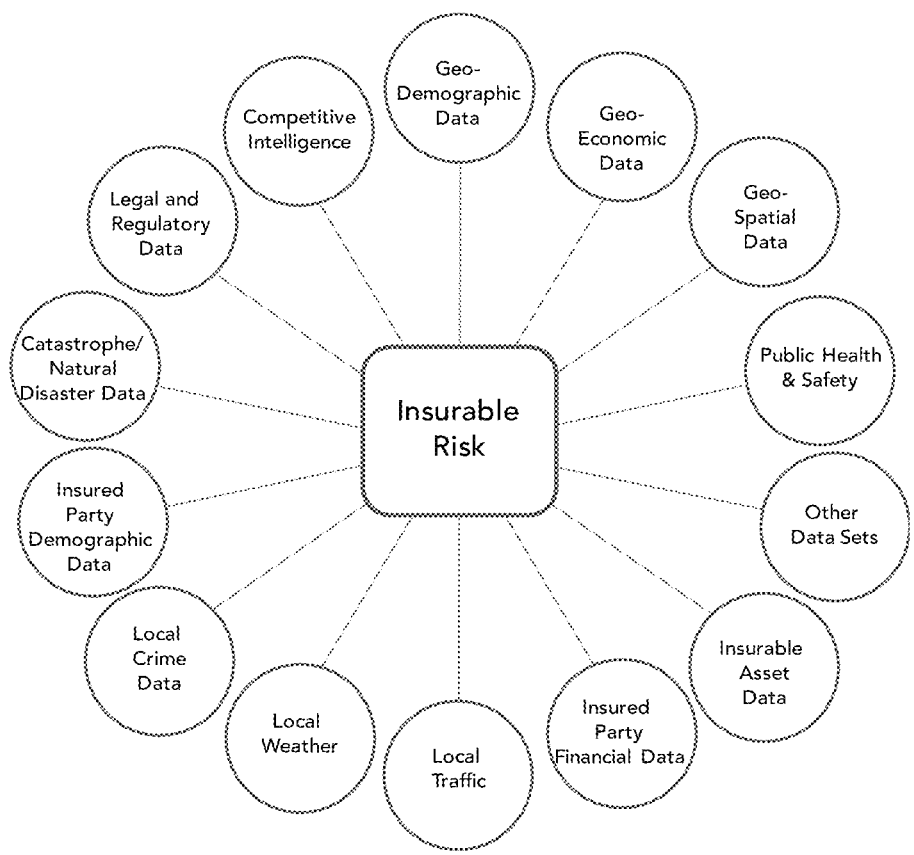
FIG. 5 provides an example of the kinds of data that may feed superior assessments of risk in the database of FIG. 1.

FIG. 5 provides an example of the kinds of data that may feed superior assessments of risk in the database 18 of FIG. 1.

The stochastic nature of targeting, acquiring, pricing, and servicing customers described in the foregoing can be decomposed into two fundamental parts: (1) the probability that that a customer undertakes a desired or undesired action; and (2) the gain or loss given that (1) occurs.

In some examples, the methods (and systems) described herein may remedy current inefficiencies at both levels by materially improving the two fundamental elements necessary for any business to target, acquire, price, and service its customers: the data upon which these decisions are based, and the mathematical mechanics that operate on the data.

The Database

Risk-based pricing requires insurance companies to look into the future to determine how much the company needs to charge customers in order to reach a target profit at both the overall and the individual level, and how to shape demand of desired or undesired customers.

At the aggregate level, the rate maker's job is to ensure that the total premium for all policies written is sufficient to cover the total expected losses and expenses and to provide for the targeted profit. At the individual risk or segment level, Principle 3 of the CAS "Statement of Principles Regarding Property and Casualty Insurance Ratemaking"

states "A rate provides for the costs associated with an individual risk transfer." A customer that presents significantly higher risk of loss (whether in loan default, marketing spend required to acquire, or insurable losses) should have a higher price charged than a customer that represents a significantly lower risk of loss.

For example, in insurance the primary component of an insurer's profit equation is the portion of an insurance rate used to cover claims and the costs of adjusting claims, known as loss costs. Loss costs have two primary components: (1) Frequency: the rate at which claims are being made; and (2) Severity: the size of the claim At the aggregate level, companies determine their prices by analyzing future loss costs and adding provision for inflation, expenses, profit, and contingencies. Most state insurance regulators require insurers to file these rate structures and to receive prior approval for every insurance product and coverage the company intends to sell to consumers living in the state. Accurate and defensible projections of loss trends are key components to the regulatory approval process.

At the individual level, premium is calculated based on a given rate per unit of risk exposed, and can vary significantly for risks with different characteristics. Units of risk are determined by rating variables, characteristics which are believed to have statistically relevant correlations to risk. Examples of variables used by auto insurers include where the vehicle is located, driving record, vehicle make, model, and age, prior insurance or gaps in insurance, age, gender, marital status, occupation, and education to name a few. Rates for any given unit of risk exposed are derived by applying a combination of proprietary company business rules, rate tables, and underwriting guidelines that have developed over time to the rating variables.

A more comprehensive basis from which to forecast customer risks at the aggregate level, and from which to base pricing at the coverage or policy level, is required to improve the efficiency and accuracy of targeting, acquiring, pricing, and servicing customers. Data is at the core of this more comprehensive basis.

Specifically, the methods (and systems) described herein may provide a more comprehensive accounting of both the particular and the fundamental components of risk, which is defined herein as risks with outcomes that can be measured in financial terms. A more comprehensive accounting of the components of risk, in turn, requires a broader and more detailed set of descriptive attributes, and a more granular measurement of and accounting for these attributes in both time and space.

A Broader and Deeper Set of Descriptive Attributes

As an example, during the insurance application process, companies tend to collect the minimum data required to quote, bind, and issue the policy, henceforth referred to herein as the "application process," with data referred to herein as "internal data." The depth and breadth of this internal data will vary depending on the state in which the policy is issued, the channel through which it is bought or sold, and the coverage(s) being purchased. Regardless of company, coverage, channel, and State of issuance, the type of policyholder attributes collected during the application process typically include, but are not limited to: (1) Basic personal identifying information, such as name, address, contact information, and Social Security Number (SSN), gender, and birth date; and (2) Basic demographic attributes such as marital status, occupation, and income.

The data collected relating to the insured risk, whether property (any asset) or casualty (any liability) will vary by coverage, by State, and by issuing company. Examples of the types of data collected during the application process include, but are not limited to, the following. In auto insurance, the data collected may include vehicle data (e.g., Make, Model, Year, Ownership: lease or own, Use—business or personal, Vehicle features: Anti-theft deterrents, accident avoidance, other vehicle safety features), driving behavior (e.g., annual miles driven, accident history, moving violations history), household data (e.g., number and ages of licensed drivers, number of insured vehicles), current insurance carrier and history (if applicable). In homeowner insurance, the data collected may include: structure location; structure attributes (e.g., structure type/use, construction year, construction quality, square footage); assessed tax value; estimated replacement cost; age and condition of key systems and/or components such as plumbing, electrical, and roof); and presence of risk factors such as animals with bite history, pools, trampolines, and presence or absence of gates, fencing, controlled access, etc.

FIGS. 6A-6Q provide additional information regarding example data.

Internal data collected during the application process and occasionally refreshed or updated (either during renewal, during the claims process, offered voluntarily by the policyholder, or proactively requested by the insurance carrier) are only partial descriptions of some elements of the insured risk, but ignore the fact that the risk posed by the insured party, asset, peril, and/or liability are inseparable from the physical environment, local community, and social fabric in which they exist, and with whom they interact every day. Insured risks do not exist in a vacuum; they are subject to dynamic intrinsic and extrinsic environmental, economic, societal, behavioral, and natural forces at all times. Little, if any, of these elements are captured or otherwise accounted for during the ratemaking process, either at the policy-level or the aggregate level for reasons detailed above.

A more comprehensive, detailed, precise, and/or accurate accounting of the intrinsic and extrinsic influencers that contribute to the particular and fundamental components of financial risk require that we augment the insurer's internal data, which, as described earlier, amount to an accounting of a small number of isolated attributes describing basic personal and property risk. The classes of data used to augment internal data is referred to herein as "external data," while together, the combination of internal and external datasets is herein referred to as the "360-Degree Database" or "Database 18". Examples of classes (or categories) of external data components of the 360-Degree Database include, but are not limited to, the following: Geo-Demographic, Geo-Economic, Geospatial, Traffic, Weather, Catastrophes and Natural Disasters, Public Health and Safety, Legal and Regulatory, Societal, Industry Benchmarks, Insured Asset Class data, Insured Party Financial data, and Insured Party Behavioral data. The term "insured party" can represent an individual, a household, a business or other entity.

A more granular accounting of geospatial descriptors.

Insurers required to submit rate structures to State regulators base the structures on state-wide loss-cost projections by coverage, and from time to time, other subcategories including, but not limited to, sales channel. Aggregating risk data and claims experience data at the state level in order to project loss costs and loss trends and create state-specific rate structures ignores vital regional, local, and/or hyper-local differences between and among geographic, demographic, economic, and other distinguishing characteristics. Using the state of Texas as an example, the interior border city of El Paso is different in almost every meaningful way when compared to a major coastal metropolitan city like Houston. Each city represents an entirely different risk profile. A more representative methodology aggregates data at a much finer grain—at minimum, at the Metropolitan Statistical Area (MSA) level, and ideally at the Zip Code Tabulation Area (ZCTA) level. In order of granularity, or degree of refinement, from least detailed to most detailed, includes but is not limited to the following:

Metropolitan Statistical Area: As of this writing, the United States Office of Management and Budget (OMB) has defined 388 Metropolitan Statistical Areas (MSAs) for the United States and seven for Puerto Rico. The OMB defines a Metropolitan Statistical Area as one or more adjacent counties or county equivalents that have at least one urban core area of at least 50,000 population, plus adjacent territory that has a high degree of social and economic integration with the core as measured by commuting ties. A list of MSAs may be found at https://en.wikipedia.org/wiki/List_of_Metropolitan_Statistical_Areas, and a map of MSAs may be found at https://www.census gov/geo/maps-data/maps/cbsacsa.html.

Micropolitan Statistical Area: As of this writing, the United States Office of Management and Budget (OMB) has defined 536 Micropolitan Statistical Areas (µSAs) for the United States and five for Puerto Rico. The OMB defines a Micropolitan Statistical Area as one or more adjacent counties or county equivalents that have at least one urban core area of at least 10,000 population but less than 50,000, plus adjacent territory that has a high degree of social and economic integration with the core as measured by commuting ties. A list of µSAs may be found at: https://en.wikipedia.org/wiki/Micropolitan_statistical_area. A map of µSAs may be found at: https://www.census.gov/geo/maps-data/map s/cbsacsa.html.

Combined Statistical Area: Together, Metropolitan Statistical Areas and Micropolitan Statistical Areas combine to form Combined Statistical Areas (CSAs.) A combined statistical area (CSA) is composed of adjacent metropolitan (MSA) and micropolitan statistical areas (µSA) in the United States and Puerto Rico that can demonstrate economic or social linkage. The United States Office of Management and Budget defines a CSA as consisting of various combinations of adjacent metropolitan and micropolitan areas with economic ties measured by commuting patterns. These areas that combine retain their own designations as metropolitan or micropolitan statistical areas within the larger combined statistical area.

The primary distinguishing factor between a CSA and an MSA/µSA is that the social and economic ties between the individual MSAs/µSAs within a CSA are at lower levels than between the counties within an MSA. CSAs represent multiple metropolitan or micropolitan areas that have an employment interchange of at least 15% with the central county or counties of the parent MSA/µSA. CSAs often represent regions with overlapping labor and media markets. A list of Combined Statistical Areas may be found at: https://en.wikipedia.org/wiki/Combined_statistical_area. A map of Combined Statistical Areas may be found at: https://www.census.gov/geo/maps-data/maps/cbsacsa.html. A delineation may be found at: https://www.census.gov/programs-surveys/metro-micro/geographies/geographic-reference-files.html.

Core-Based Statistical Area—As of this writing, the United States Office of Management and Budget (OMB) has defined 917 core-based statistical areas (CBSAs) for the United States and 12 for Puerto Rico. The OMB defines a core-based statistical area as one or more adjacent counties or county equivalents that have at least one urban core area of at least 10,000 population, plus adjacent territory that has a high degree of social and economic integration with the core as measured by commuting ties. The 929 Core Based Statistical Areas currently defined by the OMB include the 388 metropolitan statistical areas (MSAs), which have an urban core population of at least 50,000, and the 541 Micropolitan statistical areas (µSAs), which have an urban core population of at least 10,000 but less than 50,000.

Zip Code Tabulation Area-Zip Code Tabulation Area (ZCTAs) are generalized area representations of the United States Postal Service (USPS) ZIP code service areas, but are not the same as ZIP codes. Individual USPS ZIP codes can cross state, place, county, census tract, census block group and census block boundaries, so the Census Bureau asserts that "there is no correlation between ZIP codes and Census Bureau geography". Each ZCTA is constructed by aggregating the Census blocks whose addresses use a given ZIP code. In assembling census statistical units to create ZCTAs, the Census Bureau took the ZIP code used by the majority of addresses in each census unit at the time the data was compiled. As of this writing, there are approximately 32,000 ZCTAs.

Exact Latitude/Longitude—Geo-Positioning Satellites and other location mapping technology makes it possible to pinpoint values to exact locations, represented by latitude and longitude.

A more granular accounting of temporal descriptors.

Regardless of coverage, state, issuing company, or channel, the ability for insurance carriers to update the internal data collected during the application process, or add to it, are limited to a narrow set of circumstances: (1) the policyholder proactively provides additional information, or proactively updates existing information. This is commonly related to a change in address or some other life event; (2) the policyholder provides additional information, or updates existing information, at the request of the insurer; and (3) the policyholder makes a claim.

Generally, any exposure, defined herein as the intrinsic and extrinsic factors pertaining to any financial risk, that subject that risk to loss from some hazard or contingency, are not only localized, but also vary significantly from day to day, even hour to hour. Morning rush hour commuters face very different risks than do midnight shift workers on their daily commutes to work. The risk to both is different on a typical Sunday than on a typical Monday. Likewise, any structure's exposure to the risk of fire is different on July $4^{th}$ than on most other days during the year. Residents in New York state's lake-effect snow belt contend with much different seasonal driving conditions than do residents of Manhattan. As such, values for each internal and external data attribute must be accounted for on at minimum a daily basis. More granular temporal designations—hourly, for instance, or in some cases, in real time, are possible and preferable in cases including but not limited to local weather events, local traffic flow, and local traffic congestion metrics.

Current Ratemaking Practices

Generalized Linear Models (GLMs) are widely recognized as the standard method across industries for rating and underwriting prospect and customer risk in most developed markets worldwide.

The goal of GLMs is to express the relationship between an observed response variable (Y) and a limited number of predictors (X), and is traditionally expressed as:

$$E[Y]=g^{-1}(a_0+a_1X_1+\ldots+a_nX_n)$$

where (g) is the link function, expressing the relationship between random and systematic components.

However, projecting risk at the aggregate level with GLMs is cumbersome, the statistical models utilized are limited and inflexible, and the number and type of potential predictive data elements available for analysis is severely restricted.

The foundation of any GLM model is a complex web interrelated assumptions. GLMs rely on explicit assumptions about the underlying distributions (mean and variance) of each parameter (Norma, Poisson, Gamma, Binomial, Inverse Gaussian, Negative Binomial, Tweedie, etc.) and the nature of the relationship between and among possible predictive variables. Reality is rarely so neat and orderly. Any single assumption that does not hold invalidates all results.

The number of explanatory predictors (rating variables) GLM models can accommodate are limited in number and format. GLMs do not provide a system for finding all relevant interactions, and it is not practical for companies to test all extant combinations of three-way interactions, let alone interactions involving four, five, or more predictors, by trail-and-error.

GLMs rely on limited categories of linear models. Real-world phenomena are distinctly non-linear.

The quality of the models and the veracity of their output relies heavily on the skill of the user. Troubleshooting inconsistencies requires users to deconstruct layer upon layer of interrelated assumptions, which is difficult, time consuming, and prone to errors and oversights. Adjustments often have unintended downstream consequences.

GLMs are used to produce state-level filings that aim to be right in the aggregate, on average, over time. Business strategies based on coverage-level cost projections for an entire state a year in advance impede the agility required to react to changing market conditions, while the lack of pricing precision restricts the carrier's ability to micro-target high-value market segments. Further, pricing inefficiency practically guarantees that the company underwrites risk they do not want.

One of the most significant underpinnings of the risk underwriting process is access to data. At the individual level, the accuracy of these judgements depends upon the depth, breadth, and quality of rating variables available on hand.

For example, Insurance companies select rating variables because they are statistically correlated with risk. Of course, correlations are extremely common in every walk of life, may be the result of hidden or missing variables, and do not imply causation.

Too narrow in scope: The characteristics that determine risk are often highly localized, varying from place to place and from day to day. Current ratemaking practices often ignore entire classes local geo-demographic, socioeconomic, and climatological factors that shape the environmental component of risk. Additionally, companies select rating variables because they are statistically correlated with risk. Of course, correlations are extremely common in every walk of life, may be the result of hidden or missing variables, and do not imply causation.

Too narrow in breadth: Risk underwriting variables are subject to a "Catch 22"—the variables utilized to classify risk are limited by data that has been historically collected. Because there is a cost to collecting, maintaining, and storing data, companies maintain only that data which have historically been utilized in statistical modeling—limited in both scope and format. The absence of entire classes of data impair current risk rating processes from accurately reflecting risk.

The inability to integrate unstructured data into linear statistical models will put even more distance between legacy ratemaking processes and reality. Photographs from accident sites and adjusters in the field, written police reports, video footage from traffic cameras or satellites, and recorded audio from customer-carrier interactions are just a few examples of valuable data that cannot be integrated into current statistical ratemaking processes.

Infrequently refreshed: Absent a claim, insurance companies will not typically interact with their policyholders during the term of the policy. While factors contributing to any risk can be dynamic and fluid, and, in the event of influencers like local weather, can change minute to minute, the limited data insurance companies rely on is often self-reported by applicants, difficult to verify, and updated infrequently.

In summary, current ratemaking processes are inefficient at both the aggregate and policy level. Rigid, inflexible, and restricted GLMs rely on dense layers of interrelated assumptions, and force data to comply with models, rather than the other way around; Cost trend forecasts based on limited historical data and manual adjustments are subject to unintended bias, and will always miss inflection points; and Restricting the breadth, depth, and format of rating variable increases the likelihood improperly rating risks. With insurance products and services rapidly commoditizing, efficient, accurate risk assessment is more important than ever.

Methodology for Efficiently Calculating Loss Costs, Projecting Loss Trends, and Rating Individual Policies:

The application of mathematical, algorithmic, and/or computer science techniques, individually or in some combination (herein referred to as simply "artificial intelligence techniques") in conjunction with the 360-degree database will improve the efficiency and effectiveness of ratemaking for property and casualty insurance policies. Benefits include: (1) Enables the inclusion of orders of magnitude more data attributes in pricing at all levels, for all coverages; (2) Artificial intelligence techniques allow the granular data represented in the 360-degree database to interact naturally, allowing patterns between characteristics and within the data to emerge in ways that are not possible using GLM's or other traditional ratemaking techniques; (3) Does not require users to specify the predictors and interactions to be included in the model (Artificial intelligence, applied to the 360-degree database, will discover them automatically); (4) Multiple responses can be modeled using the same baseline dataset, including loss ratio, pure premium, frequency, severity, profit, retention; (5) Accuracy of output does not depend on the skill of the user; (6) Much faster and more efficient that current methods—pricing, loss cost predictions, and loss trends can be generated in minutes or less, unlike the weeks required with GLMs; (7) Results in pricing at the aggregate coverage, unit, or policy level, as well as pricing for traditional term lengths (typically 6 months or 1 year) as well as usage-based pricing similar in concept to toll roads (pricing by the trip, by the day, by the hour, or some other usage-driven unit.)

Servicing a Customer or Customers after Incurring Risk-Based Event

Once a customer has been acquired, he/she incurs a probabilistic or stochastic loss which is at some point expected to materialize. The range of challenges facing claims organizations today is vast and changes frequently. While managing claims, adjusters are continually trying to answer complex questions regarding the length of a claim, ultimate cost, likelihood of litigation, etc. The quality and availability of data strongly affects the outcome of the claim. The adjuster is left to predict the outcome of a claim qualitatively, thus relying largely on their experience. By applying the below-detailed processes, we are able to provide adjusters with a consistent, real-time prediction based upon the available data (i.e., all of the available data). By utilizing the adjuster diaries & notes, we can extract injury, incident, claimant, claim, insured person and litigation information as it becomes available.

Figure 7A:
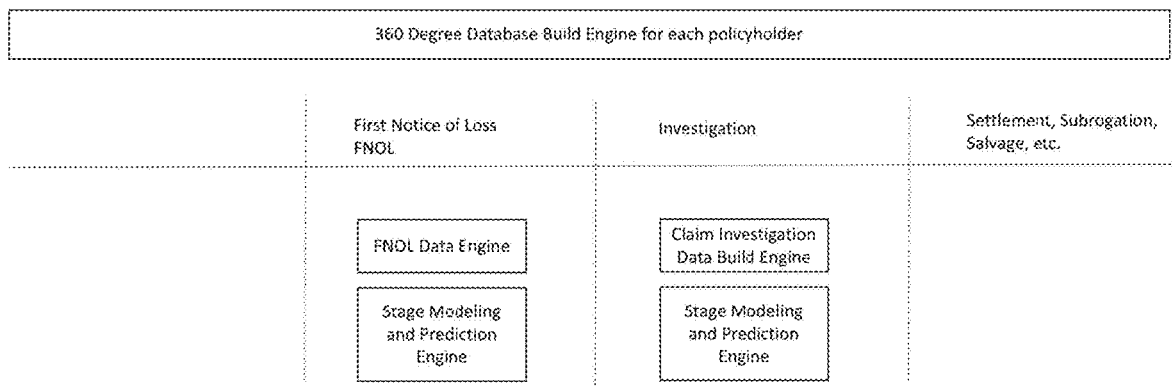
FIGS. 7A-7B illustrate an example of a workflow.
Figure 7B:
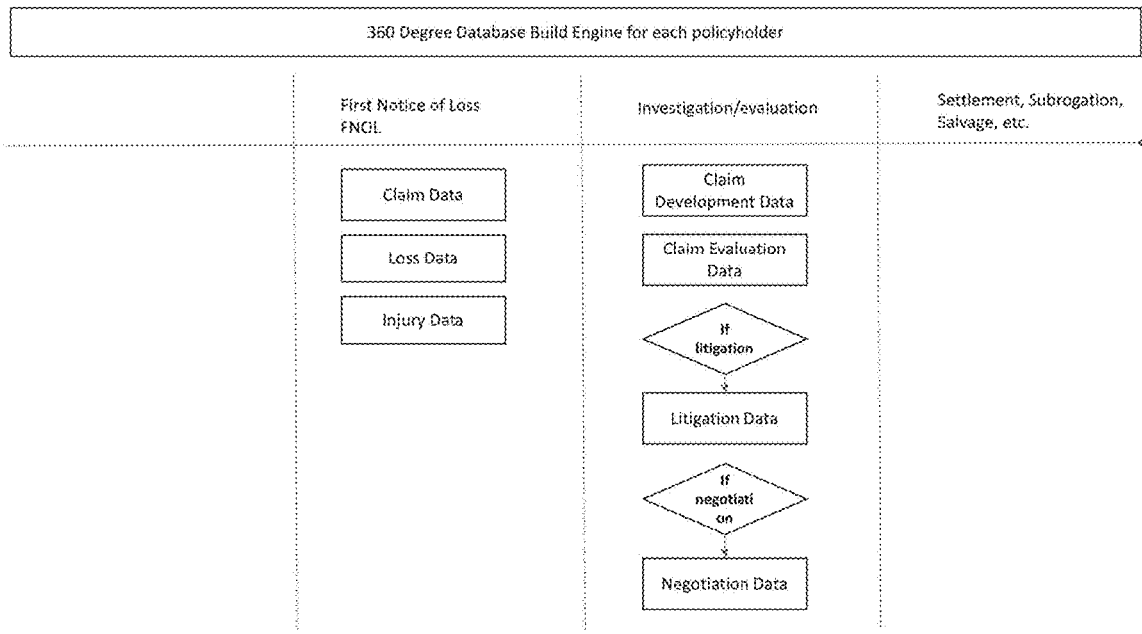
Figure 8:
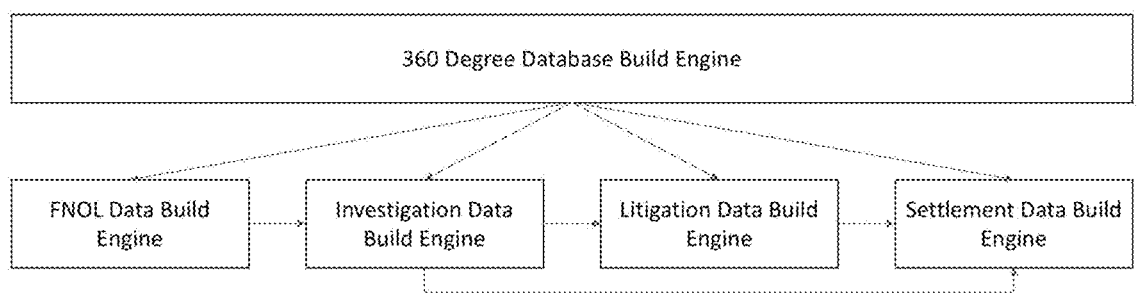
FIG. 8 illustrates an example model which can be architected atop the infrastructure.

Once a claims incident occurs, the 360-degree database again enables new functionality. FIGS. 7A-7B illustrate an example of the workflow in insurance. FIG. 8 illustrates an example model which can be architected atop the insurance infrastructure.

New data arrives at every step in a claim's lifecycle. For example, at First Notice of Loss (initial notification of a claim, or "FNOL"), an adjuster begins to collect information including, but not limited to: description of the incident; Injury situation of insured and/or other passengers, bystanders, or accident victims; Weather conditions at the time of the accident; Policy & Coverage information for the insured; Vehicle Make, Model, speeds, other salient features; and Attorney Representation.

The information can be either in the format of structured or unstructured, such as database table, images, voices or text. The form of text notes is a very important method for adjusters to track claim development information from the very beginning. The adjuster notes extraction engine performs a set of natural language processing algorithms, including but not limited to, bagging of word, TF-IDF, LDA, topic modeling, sentiment analysis and deep neural network, to extract information into the structured format, the information can be: Person's injury information, where the injury is and how severity it is, etc.; The treatment of the injury, such as x-ray, MRI, ambulance to ER/hospital; Incident information, such as the type of incident; If an attorney is representing for a claimant; The policy report; and Initial liability.

Figure 9:
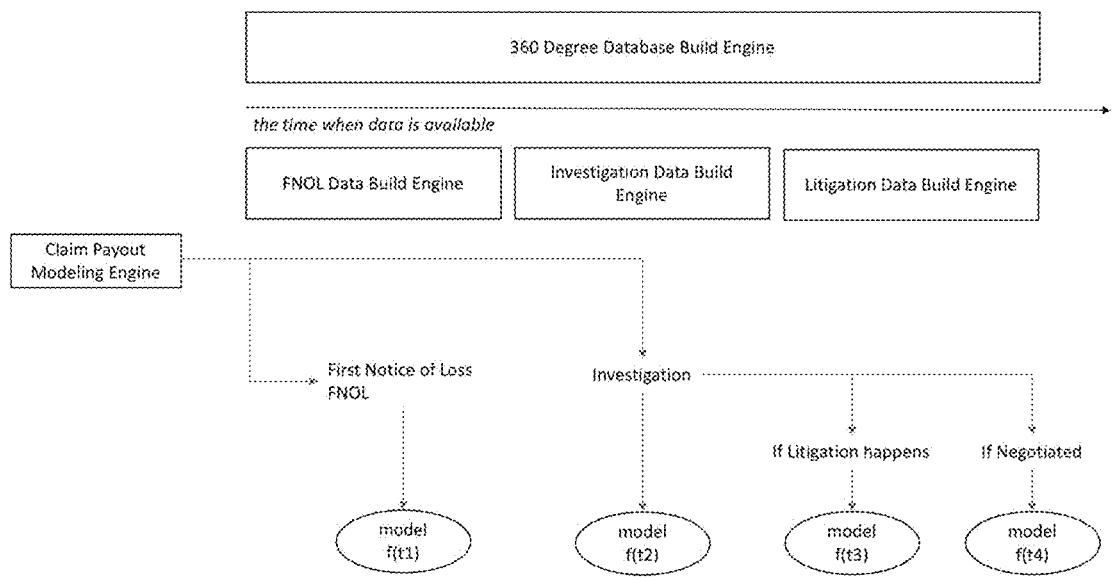
FIG. 9 illustrates an example of an architecture for claim payout and modelling.

In many instances, much of the information about the insured, incident, claimant, negotiations, litigation, etc. is stored in unstructured data such as adjuster's notes, police reports, medical records that is not available through general structured datasets. Once the information from unstructured data is extracted, it can be combined with a part of the 360 Degree database for answering questions of a claim by the modeling engine. FIG. 9 illustrates an example of an architecture for claim payout and modelling.

As information is being collected cross a claim's whole lifecycle, not only the first notice of loss, the workflow described above can be repeatedly applied to add more information to a claim at multiple stages, therefore, the methods (and systems) described herein illustrate a real-time workflow to build models to answer questions related to claims at different stages and in real-time.

More information can be extracted from the unstructured data: (1) The negotiation process, such as demand and offer amounts; (2) The lawsuit filing venue; (3) The claim evaluation; (4) Injury diagnosis report; (5) Medical bill; (6) etc.

In some examples, the methods (and systems) described herein may be used to predict the indemnity for a bodily injury liability claim at multiple stages. The payout modeling engine controls a set of algorithms in artificial intelligence and is a data-driven process.

When data at FNOL is collected by the FNOL Data Build Engine, the payout modeling engine runs the algorithms to find the model/models that best fit to the given dataset.

As claims under the investigation stage, the Investigation Data Build Engine makes more information available and provides it to the payout modeling engine, to produce new version of model/models that best fit the updated dataset.

For a claim, the factors of litigation and negotiation affects the settlement amount, therefore, the data build engine adds all the available information to the payout modeling engine to produce model/models that best fit the datasets under different circumstances.

Figure 10:
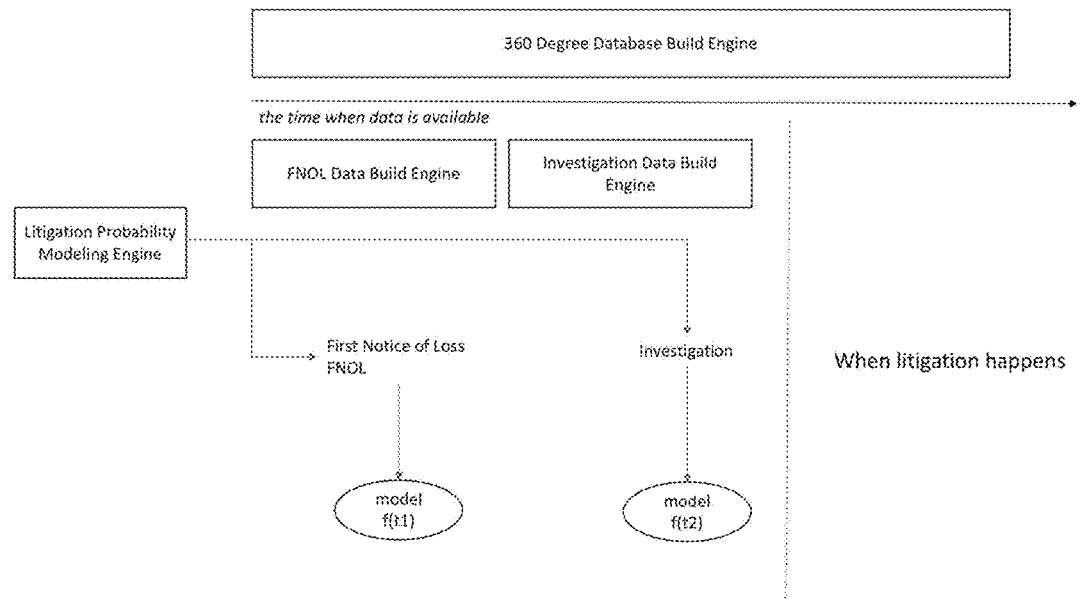
FIG. 10 illustrates an example of predicting the probability of a claim going into suit at different stages in real-time.

FIG. 10 illustrates an example of the use of the methods (and systems) described herein to predict the probability of a claim going into suit at different stages in real-time so adjusters can always have an updated view if a claim goes to suit or not, and take the most effective business decision before it happens. Being able to accurately predict which claims will go to litigation allows for claims organizations to focus specialized adjusters on such claims.

The Litigation Probability Modeling Engine controls a set of algorithms in artificial intelligence and is a data-driven process: (1) When data at FNOL is collected by the FNOL Data Build Engine, the Litigation Probability Modeling Engine runs the algorithms to find the model/models that best fit to the given dataset; (2) As claims under the investigation stage, the Investigation Data Build Engine makes more information available and provides it to the Litigation Probability Modeling, to produce new version of model/models that best fit the updated dataset.

Figure 11:
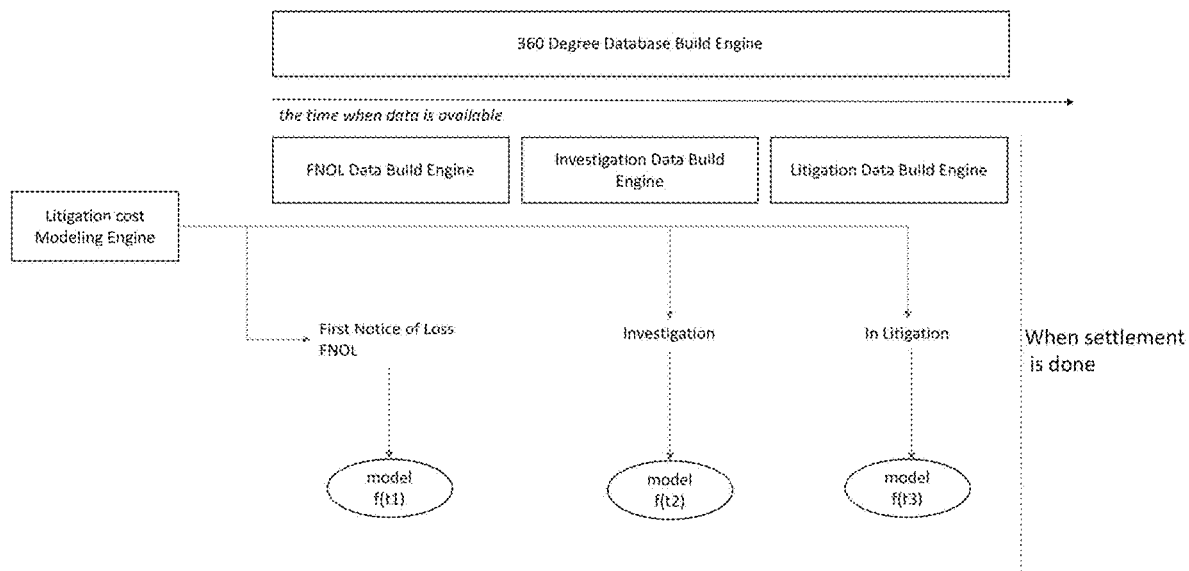
FIG. 11 illustrates an example of predicting legal costs should a claim goes into suit in real-time.

Should a claim go into suit, it's important to understand the costs. FIG. 11 illustrates an example of the use of the methods (and systems) described herein to predict legal costs should a claim goes into suit in real-time, so adjusters can have an updated view how much the total cost for a claim is and take the most effective business decision before it happens.

The Litigation Cost Modeling Engine controls a set of algorithms in artificial intelligence and is a data-driven process.

When data at FNOL is collected by the FNOL Data Build Engine, the Litigation Cost Modeling Engine runs the algorithms to find the model/models that best fit to the given dataset.

As claims under the investigation stage, the Investigation Data Build Engine makes more information available and provides it to the Litigation Cost Modeling, to produce new version of model/models that best fit the updated dataset.

In front of each of these models, a beautiful, intuitive, and interactive graphical user interface (GUI) may be implemented to let users better interact with the models. FIG. 12 illustrates an example of the graphical user interface that may allow a user to better interact with the models.

This interface displays the most relevant information about a claim, customized to each user. For example, a given adjuster will only be shown cases about which he or she has permission/responsibility to view. Each claim can be viewed by the length of time it is in suit, the likelihood of a lawsuit, the costs given a lawsuit, and the fair value of each claim.

Figure 13A:
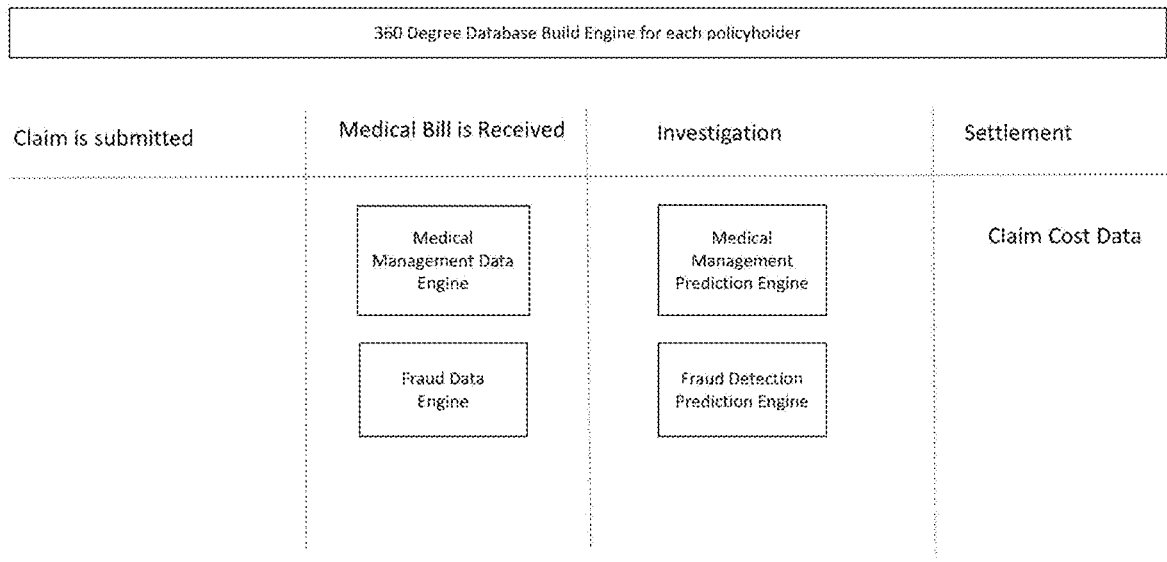
FIGS. 13A-13C illustrate examples of the processing of medical bills.
Figure 13B:
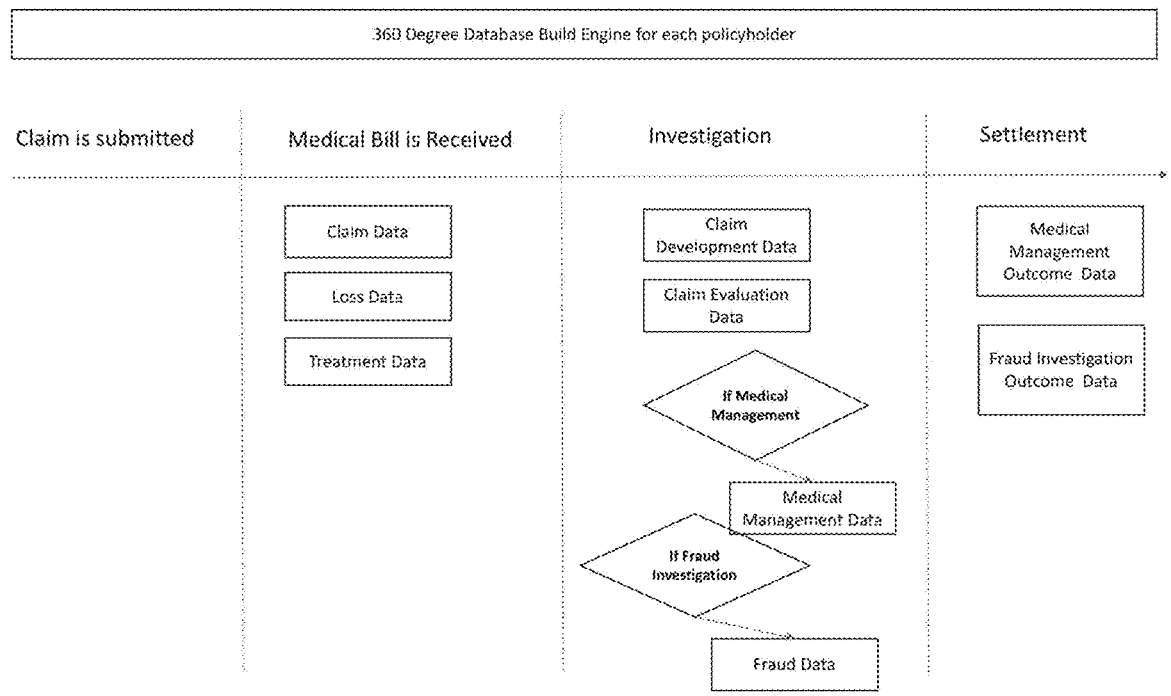
Figure 13C:
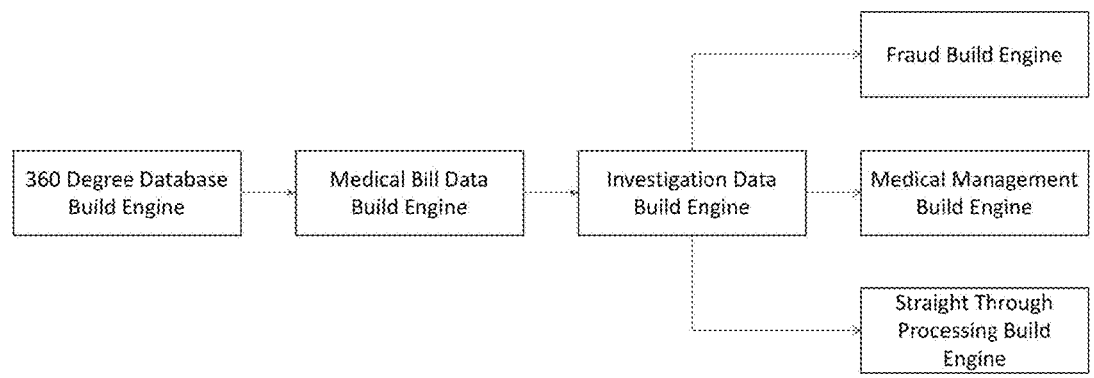

A similar system exemplifies use of the 360-degree database in automating payment (straight-through processing, "STP") of medical bills. Medical bills are processed in large numbers in certain areas and in large values (dollar amounts) in others. Many checks must be performed to ensure that the claimant has a policy with sufficient coverage, the incident and injury are consistent with the type of treatment, and the treatment is not excessive, among many other items. Of primary importance are the ability to process a large number of medical bills and also isolate those bills which should be taken exception to from a medical management or fraud perspective. Here, the addition of a fraud engine taps the 360-degree database to assess the likelihood of fraud in light of projected expenses and other individual characteristics. FIGS. 13A-13C illustrate examples of the processing of medical bills.

Figure 14A:
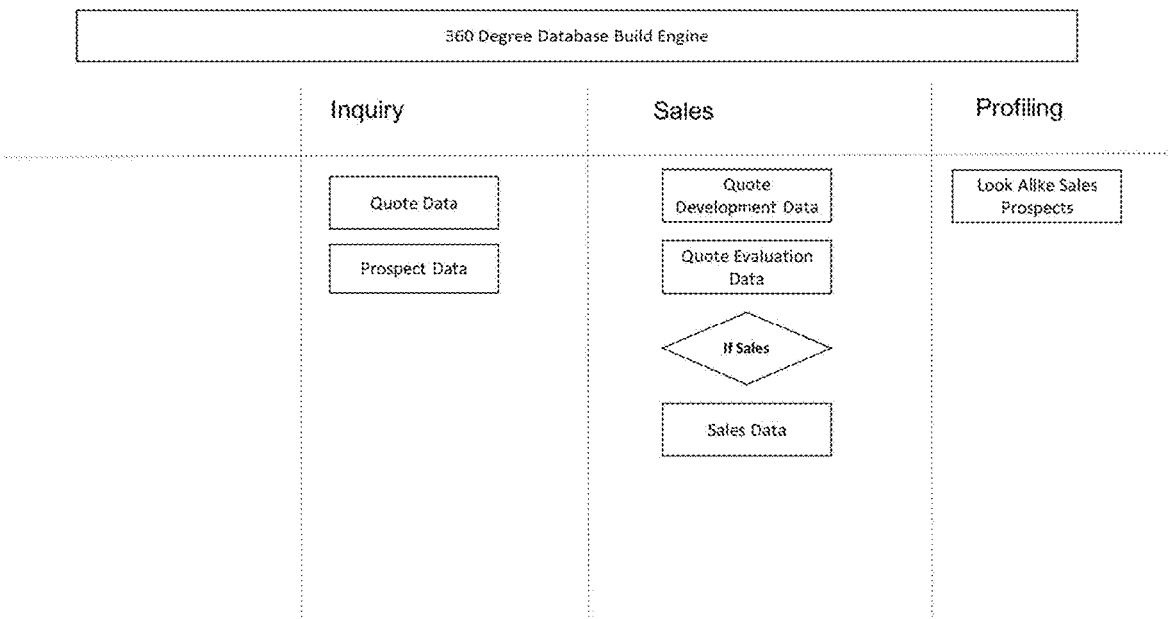
FIGS. 14A-14C illustrate examples of projecting likelihood/cost/marketing iterations.
Figure 14B:
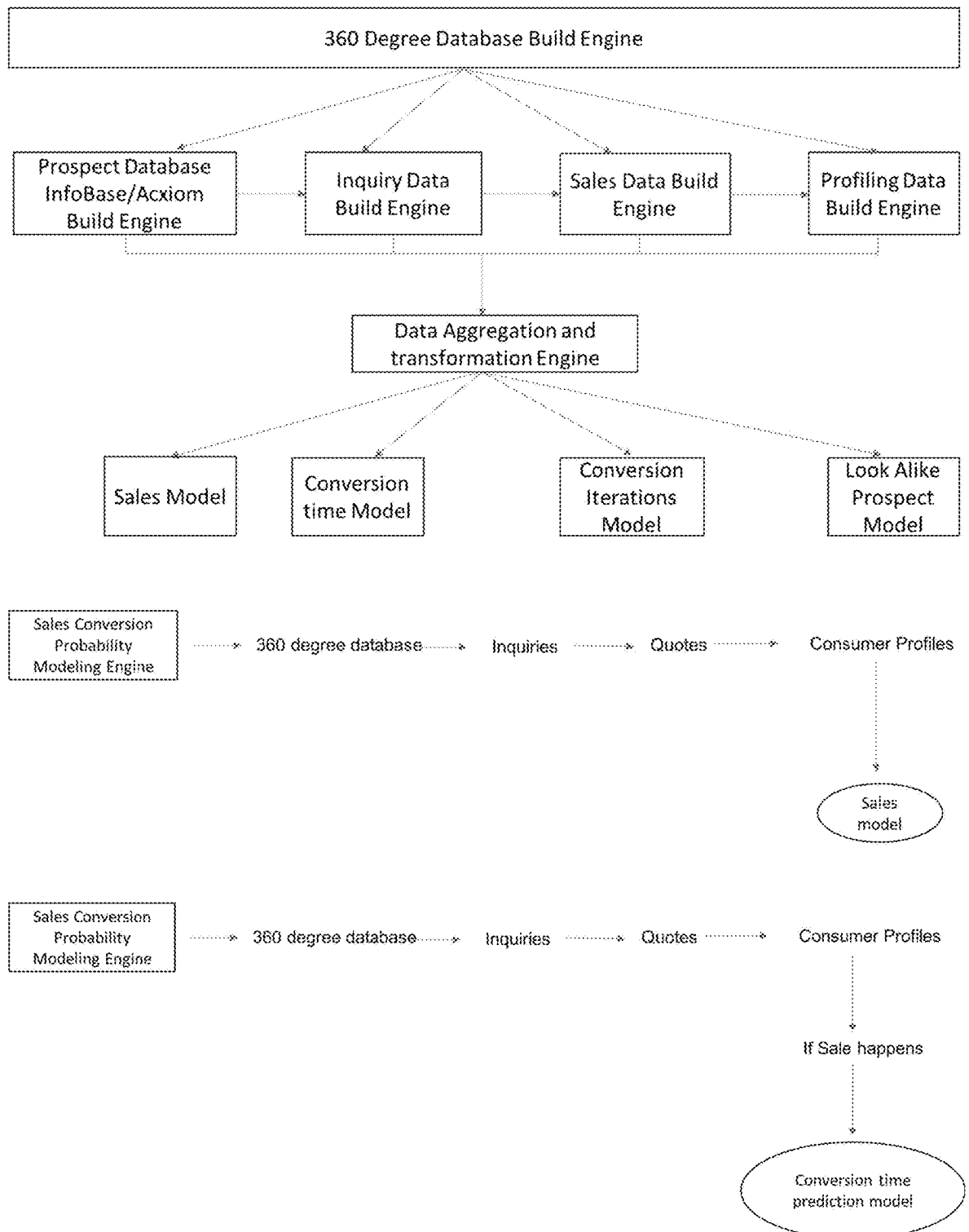
Figure 14C:
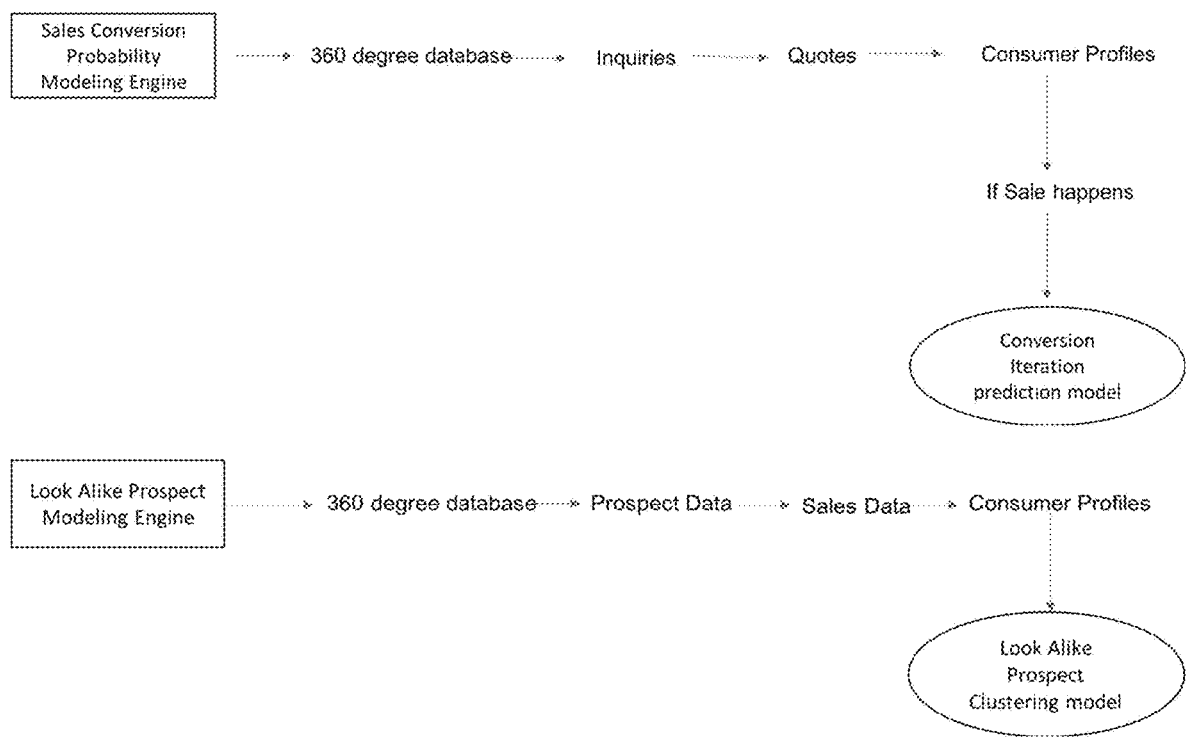

In targeting customers, the 360-degree database is turned toward identifying look-alike customers and projecting likelihood/cost/marketing iterations required to get a given customer to respond or complete a business transaction. FIGS. 14A-14C illustrate examples of projecting likelihood/cost/marketing iterations required to get a given customer to respond or complete a business transaction.

In some examples, the systems and methods described herein may generate a 360-degree data repository that more completely and more comprehensively represents intrinsic and extrinsic insurable property and casualty risk factors.

The system and methods may include the creation of a 360-degree data repository that integrates Internal and External data sources representing attributes descriptive of intrinsic and/or extrinsic risk are grouped together into like categories that include, but are not limited to, the following: Geo-Demographic data; Geo-Economic data; Geospatial data; Traffic data; Weather data; Catastrophe and Natural Disaster data; Public Health and Safety data; Legal and Regulatory data; Societal data; Industry Benchmark data; Insurable Asset Class data; Insured party Financial data, and Insured party Behavioral data. The values for each individual attribute in each data category may be measured, recorded, observed, or allocated on a daily basis or more frequently, such as hourly or in real time. Each individual attribute in each data category include values that may be updated on a daily basis or more frequently, such as hourly or in real time. Each individual attribute in each data category in the 360-degree database may be represented by values measured, recorded, observed, or allocated at the Metropolitan Statistical Level or lower, such as Zip Code Tabulation Area or Latitude/Longitude.

In some examples, the application of artificial intelligence, mathematical, algorithmic, and/or computer science techniques in conjunction with the 360-degree database may improve the efficiency and effectiveness of ratemaking for property and casualty insurance policies.

In some examples, a method may comprise improving the accuracy of policy-level Loss Cost predictions for Personal Lines property insurance policies, generated by the application of Artificial Intelligence Techniques against the 360-Degree Database. The Method may comprise generating Loss Cost predictions for personal lines Automobile insurance policies at the Metropolitan Statistical Area level or lower. The Method may comprise generating Loss Cost predictions for personal lines Automobile insurance policies on a daily basis or more frequently. The Method may comprise generating Loss Cost predictions for personal lines Motorcycle or motorized 2-wheeled and 3-wheeled, and 4-wheeled motorcycle vehicle insurance policies at the Metropolitan Statistical Area level or lower. The Method may comprise generating Loss Cost predictions for personal lines Motorcycle or motorized 2-wheeled and 3-wheeled, and 4-wheeled motorcycle vehicle insurance policies on a daily basis or more frequently. The Method may comprise generating Loss Cost predictions for personal lines Recreational Vehicle insurance policies at the Metropolitan Statistical Area level or lower. The Method may comprise generating Loss Cost predictions for personal lines Recreational Vehicle insurance policies on a daily basis or more frequently. The Method may comprise generating Loss Cost predictions for personal lines Boat insurance policies at the Metropolitan Statistical Area level or lower. The Method may comprise generating Loss Cost predictions for personal lines Boat insurance policies on a daily basis or more frequently. The Method may comprise generating Loss Cost predictions for personal lines Personal Watercraft insurance policies at the Metropolitan Statistical Area level or lower. The Method may comprise generating Loss Cost predictions for personal lines Personal Watercraft insurance policies on a daily basis or more frequently. The Method may comprise generating Loss Cost predictions for personal lines Trailer insurance policies at the Metropolitan Statistical Area level or lower. The Method may comprise generating Loss Cost predictions for personal lines Trailer insurance policies on a daily basis or more frequently. The Method may comprise generating Loss Cost predictions for personal lines Homeowner's insurance policies at the Metropolitan Statistical Area level or lower. The Method may comprise generating Loss Cost predictions for personal lines Homeowner's insurance policies on a daily basis or more frequently. The Method may comprise generating Loss Cost predictions for personal lines Condominium owner's insurance policies at the Metropolitan Statistical Level or lower. The Method may comprise generating Loss Cost predictions for personal lines Condominium owner's insurance policies on a daily basis or more frequently. The Method may comprise improving the accuracy of Loss Cost predictions for personal lines Renter's insurance policies at the Metropolitan Statistical Area level or lower. The Method may comprise improving the accuracy of Loss Cost predictions for personal lines Renter's insurance policies on a daily basis or more frequently. The Method may comprise generating Loss Cost predictions for personal lines Landlord insurance policies at the Metropolitan Statistical Area level or lower. The Method may comprise generating Loss Cost predictions for personal lines Landlord insurance policies on a daily basis or more frequently. The Method may comprise generating Loss Cost predictions for personal lines Coverage types including Bodily Injury at the Metropolitan Statistical Area level or lower. The Method may comprise generating Loss Cost predictions for personal lines Coverage types including Bodily Injury on a daily basis or more frequently. The Method may comprise generating Loss Cost predictions for personal lines Coverage types including Medical Payments at the Metropolitan Statistical Area level or lower. The Method may comprise generating Loss Cost predictions for personal lines Coverage types including Medical Payments on a daily basis or more frequently. The Method may comprise generating Loss Cost predictions for personal lines Coverage types including Collision at the Metropolitan Statistical Area level or lower. The Method may comprise generating Loss Cost predictions for personal lines Coverage types including Collision on a daily basis or more frequently. The Method may comprise generating Loss Cost predictions for personal lines Coverage types including Comprehensive at the Metropolitan Statistical Area level or lower. The Method may comprise generating Loss Cost predictions for personal lines Coverage types including Comprehensive on a daily basis or more frequently. The Method may comprise generating Loss Cost predictions for personal lines Coverage types including Property Damage at the Metropolitan Statistical Area level or lower. The Method may comprise generating Loss Cost predictions for personal lines Coverage types including Property Damage on a daily basis or more frequently. The Method may comprise generating Loss Cost predictions for personal lines Coverage types including Towing at the Metropolitan Statistical Area level or lower. The Method may comprise generating Loss Cost predictions for personal lines Coverage types including Towing on a daily basis or more frequently. The Method may comprise generating Loss Cost predictions for personal lines Coverage types including Windshield Glass Repair/Replacement at the Metropolitan Statistical Area level or lower. The Method may comprise generating Loss Cost predictions for personal lines Coverage types including Windshield Glass Repair/Replacement on a daily basis or more frequently. The Method may comprise generating Loss Cost predictions for personal lines Coverage types including Personal Injury Protection at the Metropolitan Statistical Area level or lower. The Method may comprise generating Loss Cost predictions for personal lines Coverage types including Personal Injury Protection on a daily basis or more frequently. The Method may comprise generating Loss Cost predictions for personal lines Coverage types including Roadside Assistance at the Metropolitan Statistical Area level or lower. The Method may comprise generating Loss Cost predictions for personal lines Coverage types including Roadside Assistance on a daily basis or more frequently. The Method may comprise generating Loss Cost predictions for personal lines Coverage types including Towing at the Metropolitan Statistical Area level or lower. The Method may comprise generating Loss Cost predictions for personal lines Coverage types including Towing on a daily basis or more frequently. The Method may comprise generating Loss Cost predictions for personal lines Coverage types including Rental Car Replacement at the Metropolitan Statistical Area level or lower. The Method may comprise generating Loss Cost predictions for personal lines Coverage types including Rental Car Replacement on a daily basis or more frequently. The Method may comprise generating Loss Cost predictions for personal lines Coverage types including Liability at the Metropolitan Statistical Area level or lower. The Method may comprise generating Loss Cost predictions for personal lines Coverage types including Liability on a daily basis or more frequently. The Method may comprise generating Loss Cost predictions for personal lines Coverage types including Uninsured Motorist Property Damage at the Metropolitan Statistical Area level or lower. The Method may comprise generating Loss Cost predictions for personal lines Coverage types including Uninsured Motorist Property Damage on a daily basis or more frequently. The Method may comprise generating Loss Cost predictions for personal lines Coverage types including Uninsured Motorist Liability at the Metropolitan Statistical Area level or lower. The Method may comprise generating Loss Cost predictions for personal lines Coverage types including Uninsured Motorist Liability on a daily basis or more frequently. The Method may comprise generating Loss Cost predictions for personal lines Coverage types including Uninsured Motorist Bodily Injury at the Metropolitan Statistical Area level or lower. The Method may comprise generating Loss Cost predictions for personal lines Coverage types including Uninsured Motorist Bodily Injury on a daily basis or more frequently. The Method may comprise generating Loss Cost predictions for personal lines Coverage types including Underinsured Motorist Property Damage at the Metropolitan Statistical Area level or lower. The Method may comprise generating Loss Cost predictions for personal lines Coverage types including Underinsured Motorist Property Damage on a daily basis or more frequently. The Method may comprise generating Loss Cost predictions for personal lines Coverage types including Underinsured Motorist Property Liability at the Metropolitan Statistical Area level or lower. The Method c may comprise generating Loss Cost predictions for personal lines Coverage types including Underinsured Motorist Property Liability on a daily basis or more frequently. The Method may comprise generating Loss Cost predictions for personal lines Coverage types including Underinsured Motorist Property Bodily Injury at the Metropolitan Statistical Area level or lower. The Method may comprise generating Loss Cost predictions for personal lines Coverage types including Underinsured Motorist Property Bodily Injury on a daily basis or more frequently. The Method may comprise generating Loss Cost predictions for personal lines Coverage types including Fire loss or damage perils at the Metropolitan Statistical Area level or lower. The Method may comprise generating Loss Cost predictions for personal lines Coverage types including Fire loss or damage perils on a daily basis or more frequently. The Method may comprise generating Loss Cost predictions for personal lines Coverage types including Smoke loss or damage perils at the Metropolitan Statistical Area level or lower. The Method may comprise generating Loss Cost predictions for personal lines Coverage types including Smoke loss or damage perils on a daily basis or more frequently. The Method may comprise generating Loss Cost predictions for personal lines Coverage types including Wind loss or damage perils at the Metropolitan Statistical Area level or lower. The Method may comprise generating Loss Cost predictions for personal lines Coverage types including Wind loss or damage perils on a daily basis or more frequently. The Method may comprise generating Loss Cost predictions for personal lines Coverage types including Hail loss or damage perils at the Metropolitan Statistical Area level or lower. The Method may comprise generating Loss Cost predictions for personal lines Coverage types including Hail loss or damage perils on a daily basis or more frequently. The Method may comprise generating Loss Cost predictions for personal lines Coverage types including Tornado loss or damage perils at the Metropolitan Statistical Area level or lower. The Method may comprise generating Loss Cost predictions for personal lines Coverage types including Tornado loss or damage perils on a daily basis or more frequently. The Method may comprise generating Loss Cost predictions for personal lines Coverage types including Flood loss or damage perils at the Metropolitan Statistical Area level or lower. The Method may comprise generating Loss Cost predictions for personal lines Coverage types including Flood loss or damage perils on a daily basis or more frequently. The Method may comprise generating Loss Cost predictions for personal lines Coverage types including Earthquake loss or damage perils at the Metropolitan Statistical Area level or lower. The Method may comprise generating Loss Cost predictions for personal lines Coverage types including Earthquake loss or damage perils on a daily basis or more frequently. The Method may comprise generating Loss Cost predictions for personal lines Coverage types including Theft loss or damage perils at the Metropolitan Statistical Area level or lower. The Method may comprise generating Loss Cost predictions for personal lines Coverage types including Theft loss or damage perils on a daily basis or more frequently. The Method may comprise generating Loss Cost predictions for personal lines Coverage types including Vandalism damage perils at the Metropolitan Statistical Area level or lower. The Method may comprise generating Loss Cost predictions for personal lines Coverage types including Vandalism damage perils on a daily basis or more frequently. The Method may comprise generating Loss Cost predictions for personal lines Coverage types including Wildfire loss or damage perils at the Metropolitan Statistical Area level or lower. The Method may comprise generating Loss Cost predictions for personal lines Coverage types including Wildfire loss or damage perils on a daily basis or more frequently. The Method may comprise generating Loss Cost predictions for personal lines Coverage types including Water loss or damage perils at the Metropolitan Statistical Area level or lower. The Method may comprise generating Loss Cost predictions for personal lines Coverage types including Water loss or damage perils on a daily basis or more frequently. The Method may comprise generating Loss Cost predictions for personal lines Coverage types including Hurricane/Cyclone/Typhoon/Tropical Storm loss or damage perils at the Metropolitan Statistical Area level or lower. The Method may comprise generating Loss Cost predictions for personal lines Coverage types including Hurricane/Cyclone/Typhoon/Tropical Storm loss or damage perils on a daily basis or more frequently.

In some examples, a Method may comprise improving the accuracy of policy-level Loss Cost predictions for Personal Lines casualty insurance policies, generated by the application of Artificial Intelligence Techniques against the 360-Degree Database. The Method may comprise generating Loss Cost predictions for personal lines Casualty Coverage types including personal liability umbrella insurance at the Metropolitan Statistical Area level or lower. The Method may comprise generating Loss Cost predictions for personal lines Casualty Coverage types including personal liability umbrella insurance on a daily basis or more frequently. The Method may comprise generating Loss Cost predictions for personal lines Coverage types including personal comprehensive liability insurance at the Metropolitan Statistical Area level or lower. The Method may comprise generating Loss Cost predictions for personal lines Coverage types including personal comprehensive liability insurance on a daily basis or more frequently. The Method may comprise generating Loss Cost predictions for personal lines Coverage types including personal excess liability insurance at the Metropolitan Statistical Area level or lower. The Method may comprise generating Loss Cost predictions for personal lines Coverage types including personal excess liability insurance on a daily basis or more frequently. The Method may comprise generating Loss Cost predictions for personal lines Coverage types including Renter's liability insurance at the Metropolitan Statistical Area level or lower. The Method may comprise generating Loss Cost predictions for personal lines Coverage types including Renter's liability insurance on a daily basis or more frequently. The Method may comprise generating Loss Cost predictions for personal lines Coverage types including Landlord liability insurance at the Metropolitan Statistical Area level or lower. The Method may comprise generating Loss Cost predictions for personal lines Coverage types including Landlord liability insurance on a daily basis or more frequently.

In some examples, a Method may comprise improving the accuracy of policy-level Loss Cost predictions for Commercial Lines property insurance policies, generated by the application of Artificial Intelligence Techniques against the 360-Degree Database. The Method may comprise generating policy-level Loss Cost predictions for Commercial Lines property insurance coverage types including Commercial General Liability Insurance at the Metropolitan Statistical Area level or lower. The Method may comprise generating policy-level Loss Cost predictions for Commercial Lines property insurance coverage types including Commercial General Liability insurance on a daily basis or more frequently. The Method may comprise generating policy-level Loss Cost predictions for Commercial Lines property insurance coverage types including Commercial Umbrella Insurance at the Metropolitan Statistical Area level or lower. The Method may comprise generating policy-level Loss Cost predictions for Commercial Lines property insurance coverage types including Commercial Umbrella Insurance on a daily basis or more frequently. The Method may comprise generating policy-level Loss Cost predictions for Commercial Lines property insurance coverage types including Commercial Foreign Auto insurance at the Metropolitan Statistical Area level or lower. The Method may comprise generating policy-level Loss Cost predictions for Commercial Lines property insurance coverage types including Commercial Foreign Auto insurance on a daily basis or more frequently. The Method may comprise generating policy-level Loss Cost predictions for Commercial Lines property insurance coverage types including Equipment/Mechanical Breakdown, Repair, and/or Replacement insurance at the Metropolitan Statistical Area level or lower. The Method may comprise generating policy-level Loss Cost predictions for Commercial Lines property insurance coverage types including Equipment/Mechanical Breakdown, Repair, and/or Replacement insurance at the Metropolitan Statistical Area level or lower on a daily basis or more frequently. The Method may comprise generating policy-level Loss Cost predictions for Commercial Lines property insurance coverage types including Debris Removal insurance at the Metropolitan Statistical Area level or lower. The Method may comprise generating policy-level Loss Cost predictions for Commercial Lines property insurance coverage types including Debris Removal insurance on a daily basis or more frequently. The Method may comprise generating policy-level Loss Cost predictions for Commercial Lines property insurance coverage types including Builders' Risk insurance at the Metropolitan Statistical Area level or lower. The Method may comprise generating policy-level Loss Cost predictions for Commercial Lines property insurance coverage types including Builders' Risk insurance on a daily basis or more frequently. The Method may comprise generating policy-level Loss Cost predictions for Commercial Lines property insurance coverage types including Glass repair/replacement insurance at the Metropolitan Statistical Area level or lower. The Method may comprise generating policy-level Loss Cost predictions for Commercial Lines property insurance coverage types including Glass repair/replacement insurance on a daily basis or more frequently. The Method may comprise generating policy-level Loss Cost predictions for Commercial Lines property insurance coverage types including Inland Marine insurance at the Metropolitan Statistical Area level or lower. The Method may comprise generating policy-level Loss Cost predictions for Commercial Lines property insurance coverage types including Inland Marine insurance on a daily basis or more frequently. The Method may comprise generating policy-level Loss Cost predictions for Commercial Lines property insurance coverage types including Business Interruption insurance at the Metropolitan Statistical Area level or lower. The Method may comprise generating policy-level Loss Cost predictions for Commercial Lines property insurance coverage types including Business Interruption insurance on a daily basis or more frequently. The Method may comprise generating policy-level Loss Cost predictions for Commercial Lines property insurance coverage types including Ordinance/Law Insurance at the Metropolitan Statistical Area level or lower. The Method may comprise generating policy-level Loss Cost predictions for Commercial Lines property insurance coverage types including Ordinance/Law Insurance on a daily basis or more frequently. The Method may comprise generating policy-level Loss Cost predictions for Commercial Lines property insurance coverage types including Tenants Insurance at the Metropolitan Statistical Area level or lower. The Method may comprise generating policy-level Loss Cost predictions for Commercial Lines property insurance coverage types including Tenants Insurance on a daily basis or more frequently. The Method may comprise generating policy-level Loss Cost predictions for Commercial Lines property insurance coverage types including Theft/Vandalism/Other Crime Insurance at the Metropolitan Statistical Area level or lower. The Method may comprise generating policy-level Loss Cost predictions for Commercial Lines property insurance coverage types including Theft/Vandalism/Other Crime Insurance on a daily basis or more frequently. The Method may comprise generating policy-level Loss Cost predictions for Commercial Lines property insurance coverage types including Fidelity Bond insurance at the Metropolitan Statistical Area level or lower. The Method may comprise generating policy-level Loss Cost predictions for Commercial Lines property insurance coverage types including Fidelity Bond insurance on a daily basis or more frequently. The Method may comprise generating policy-level Loss Cost predictions for Commercial Lines property insurance coverage types including Fire and/or Smoke damage or loss insurance at the Metropolitan Statistical Area level or lower. The Method may comprise generating policy-level Loss Cost predictions for Commercial Lines property insurance coverage types including Fire and/or Smoke damage or loss insurance on a daily basis or more frequently.

In some examples, a Method may comprise improving the accuracy of policy-level Loss Cost predictions for Commercial Lines casualty insurance policies, generated by the application of Artificial Intelligence Techniques against the 360-Degree Database. The Method may comprise generating Loss Cost predictions for Commercial Lines casualty insurance coverage types including Commercial General Liability insurance at the Metropolitan Statistical Area level or lower. The Method may comprise generating policy-level Loss Cost predictions for Commercial Lines casualty insurance coverage types including Commercial General Liability insurance on a daily basis or more frequently. The Method may comprise generating policy-level Loss Cost predictions for Commercial Lines casualty insurance coverage types including Commercial Errors and Omissions Insurance at the Metropolitan Statistical Area level or lower. The Method may comprise generating policy-level Loss Cost predictions for Commercial Lines casualty insurance coverage types including Commercial Errors and Omissions Insurance on a daily basis or more frequently. The Method may comprise generating policy-level Loss Cost predictions for Commercial Lines casualty insurance coverage types including Commercial Workers Compensation Insurance at the Metropolitan Statistical Area level or lower. The Method may comprise generating policy-level Loss Cost predictions for Commercial Lines casualty insurance coverage types including Commercial Workers Compensation Insurance on a daily basis or more frequently. The Method may comprise generating policy-level Loss Cost predictions for Commercial Lines casualty insurance coverage types including Commercial Umbrella Insurance at the Metropolitan Statistical Area level or lower. The Method may comprise generating policy-level Loss Cost predictions for Commercial Lines casualty insurance coverage types including Commercial Umbrella Insurance on a daily basis or more frequently. The Method may comprise generating policy-level Loss Cost predictions for Commercial Lines casualty insurance coverage types including Commercial Excess Liability Insurance at the Metropolitan Statistical Area level or lower. The Method may comprise generating policy-level Loss Cost predictions for Commercial Lines casualty insurance coverage types including Commercial Excess Liability Insurance on a daily basis or better. The Method may comprise generating policy-level Loss Cost predictions for Commercial Lines casualty insurance coverage types including Commercial Foreign Liability Insurance at the Metropolitan Statistical Area level or lower. The Method may comprise generating policy-level Loss Cost predictions for Commercial Lines casualty insurance coverage types including Commercial Foreign Liability Insurance on a daily basis or better. The Method may comprise generating policy-level Loss Cost predictions for Commercial Lines casualty insurance coverage types including Commercial Foreign Workers Compensation Insurance at the Metropolitan Statistical Area level or lower. The Method may comprise generating policy-level Loss Cost predictions for Commercial Lines casualty insurance coverage types including Commercial Foreign Workers Compensation Insurance on a daily basis or better. The Method may comprise generating policy-level Loss Cost predictions for Commercial Lines casualty insurance coverage types including Malpractice insurance at the Metropolitan Statistical Area level or lower. The Method may comprise generating policy-level Loss Cost predictions for Commercial Lines casualty insurance coverage types including Malpractice insurance at the Metropolitan Statistical Area level or lower.

In some examples, a Method may comprise improving the accuracy of aggregate-level Loss Trend projections for Personal Lines property insurance policies, generated by the application of Artificial Intelligence Techniques against the 360-Degree Database. The Method may comprise generating Loss Trend projections for personal lines Automobile insurance policies at the Metropolitan Statistical Area level or lower. The Method may comprise generating Loss Trend projections for personal lines Automobile insurance policies on a daily basis or more frequently. The Method may comprise generating Loss Trend projections for personal lines Motorcycle or motorized 2-wheeled and 3-wheeled, and 4-wheeled motorcycle vehicle insurance policies at the Metropolitan Statistical Area level or lower. The Method may comprise generating Loss Trend projections for personal lines Motorcycle or motorized 2-wheeled and 3-wheeled, and 4-wheeled motorcycle vehicle insurance policies on a daily basis or more frequently. The Method may comprise generating Loss Trend projections for personal lines Recreational Vehicle insurance policies at the Metropolitan Statistical Area level or lower. The Method may comprise generating Loss Trend projections for personal lines Recreational Vehicle insurance policies on a daily basis or more frequently. The Method may comprise generating Loss Trend projections for personal lines Boat insurance policies at the Metropolitan Statistical Area level or lower. The Method may comprise generating Loss Trend projections for personal lines Boat insurance policies on a daily basis or more frequently. The Method may comprise generating Loss Trend projections for personal lines Personal Watercraft insurance policies at the Metropolitan Statistical Area level or lower. The Method may comprise generating Loss Trend projections for personal lines Personal Watercraft insurance policies on a daily basis or more frequently. The Method may comprise generating Loss Trend projections for personal lines Trailer insurance policies at the Metropolitan Statistical Area level or lower. The Method may comprise generating Loss Trend projections for personal lines Trailer insurance policies on a daily basis or more frequently. The Method may comprise generating Loss Trend projections for personal lines Homeowner's insurance policies at the Metropolitan Statistical Area level or lower. The Method may comprise generating Loss Trend projections for personal lines Homeowner's insurance policies on a daily basis or more frequently. The Method may comprise generating Loss Trend projections for personal lines Condominium owner's insurance policies at the Metropolitan Statistical Level or lower. The Method may comprise generating Loss Trend projections for personal lines Condominium owner's insurance policies on a daily basis or more frequently. The Method may comprise improving the accuracy of Loss Trend projections for personal lines Renter's insurance policies at the Metropolitan Statistical Area level or lower. The Method may comprise improving the accuracy of Loss Trend projections for personal lines Renter's insurance policies on a daily basis or more frequently. The Method may comprise generating Loss Trend projections for personal lines Landlord insurance policies at the Metropolitan Statistical Area level or lower. The Method may comprise generating Loss Trend projections for personal lines Landlord insurance policies on a daily basis or more frequently. The Method may comprise generating Loss Trend projections for personal lines Coverage types including Bodily Injury at the Metropolitan Statistical Area level or lower. The Method may comprise generating Loss Trend projections for personal lines Coverage types including Bodily Injury on a daily basis or more frequently. The Method may comprise generating Loss Trend projections for personal lines Coverage types including Medical Payments at the Metropolitan Statistical Area level or lower. The Method may comprise generating Loss Trend projections for personal lines Coverage types including Medical Payments on a daily basis or more frequently. The Method may comprise generating Loss Trend projections for personal lines Coverage types including Collision at the Metropolitan Statistical Area level or lower. The Method may comprise generating Loss Trend projections for personal lines Coverage types including Collision on a daily basis or more frequently. The Method may comprise generating Loss Trend projections for personal lines Coverage types including Comprehensive at the Metropolitan Statistical Area level or lower. The Method may comprise generating Loss Trend projections for personal lines Coverage types including Comprehensive on a daily basis or more frequently. The Method may comprise generating Loss Trend projections for personal lines Coverage types including Property Damage at the Metropolitan Statistical Area level or lower. The Method may comprise generating Loss Trend projections for personal lines Coverage types including Property Damage on a daily basis or more frequently. The Method may comprise generating Loss Trend projections for personal lines Coverage types including Towing at the Metropolitan Statistical Area level or lower. The Method may comprise generating Loss Trend projections for personal lines Coverage types including Towing on a daily basis or more frequently. The Method may comprise generating Loss Trend projections for personal lines Coverage types including Windshield Glass Repair/Replacement at the Metropolitan Statistical Area level or lower. The Method may comprise generating Loss Trend projections for personal lines Coverage types including Windshield Glass Repair/Replacement on a daily basis or more frequently. The Method may comprise generating Loss Trend projections for personal lines Coverage types including Personal Injury Protection at the Metropolitan Statistical Area level or lower. The Method may comprise generating Loss Trend projections for personal lines Coverage types including Personal Injury Protection on a daily basis or more frequently. The Method may comprise generating Loss Trend projections for personal lines Coverage types including Roadside Assistance at the Metropolitan Statistical Area level or lower. The Method may comprise generating Loss Trend projections for personal lines Coverage types including Roadside Assistance on a daily basis or more frequently. The Method may comprise generating Loss Trend projections for personal lines Coverage types including Towing at the Metropolitan Statistical Area level or lower. The Method may comprise generating Loss Trend projections for personal lines Coverage types including Towing on a daily basis or more frequently. The Method may comprise generating Loss Trend projections for personal lines Coverage types including Rental Car Replacement at the Metropolitan Statistical Area level or lower. The Method may comprise generating Loss Trend projections for personal lines Coverage types including Rental Car Replacement on a daily basis or more frequently. The Method may comprise generating Loss Trend projections for personal lines Coverage types including Liability at the Metropolitan Statistical Area level or lower. The Method may comprise generating Loss Trend projections for personal lines Coverage types including Liability on a daily basis or more frequently. The Method may comprise generating Loss Trend projections for personal lines Coverage types including Uninsured Motorist Property Damage at the Metropolitan Statistical Area level or lower. The Method may comprise generating Loss Trend projections for personal lines Coverage types including Uninsured Motorist Property Damage on a daily basis or more frequently. The Method may comprise generating Loss Trend projections for personal lines Coverage types including Uninsured Motorist Liability at the Metropolitan Statistical Area level or lower. The Method may comprise generating Loss Trend projections for personal lines Coverage types including Uninsured Motorist Liability on a daily basis or more frequently. The Method may comprise generating Loss Trend projections for personal lines Coverage types including Uninsured Motorist Bodily Injury at the Metropolitan Statistical Area level or lower. The Method may comprise generating Loss Trend projections for personal lines Coverage types including Uninsured Motorist Bodily Injury on a daily basis or more frequently. The Method may comprise generating Loss Trend projections for personal lines Coverage types including Underinsured Motorist Property Damage at the Metropolitan Statistical Area level or lower. The Method may comprise generating Loss Trend projections for personal lines Coverage types including Underinsured Motorist Property Damage on a daily basis or more frequently. The Method may comprise generating Loss Trend projections for personal lines Coverage types including Underinsured Motorist Property Liability at the Metropolitan Statistical Area level or lower. The Method may comprise generating Loss Trend projections for personal lines Coverage types including Underinsured Motorist Property Liability on a daily basis or more frequently. The Method may comprise generating Loss Trend projections for personal lines Coverage types including Underinsured Motorist Property Bodily Injury at the Metropolitan Statistical Area level or lower. The Method may comprise generating Loss Trend projections for personal lines Coverage types including Underinsured Motorist Property Bodily Injury on a daily basis or more frequently. The Method may comprise generating Loss Trend projections for personal lines Coverage types including Fire loss or damage perils at the Metropolitan Statistical Area level or lower. The Method may comprise generating Loss Trend projections for personal lines Coverage types including Fire loss or damage perils on a daily basis or more frequently. The Method may comprise generating Loss Trend projections for personal lines Coverage types including Smoke loss or damage perils at the Metropolitan Statistical Area level or lower. The Method may comprise generating Loss Trend projections for personal lines Coverage types including Smoke loss or damage perils on a daily basis or more frequently. The Method may comprise generating Loss Trend projections for personal lines Coverage types including Wind loss or damage perils at the Metropolitan Statistical Area level or lower. The Method may comprise generating Loss Trend projections for personal lines Coverage types including Wind loss or damage perils on a daily basis or more frequently. The Method may comprise generating Loss Trend projections for personal lines Coverage types including Hail loss or damage perils at the Metropolitan Statistical Area level or lower. The Method may comprise generating Loss Trend projections for personal lines Coverage types including Hail loss or damage perils on a daily basis or more frequently. The Method may comprise generating Loss Trend projections for personal lines Coverage types including Tornado loss or damage perils at the Metropolitan Statistical Area level or lower. The Method may comprise generating Loss Trend projections for personal lines Coverage types including Tornado loss or damage perils on a daily basis or more frequently. The Method may comprise generating Loss Trend projections for personal lines Coverage types including Flood loss or damage perils at the Metropolitan Statistical Area level or lower. The Method may comprise generating Loss Trend projections for personal lines Coverage types including Flood loss or damage perils on a daily basis or more frequently. The Method may comprise generating Loss Trend projections for personal lines Coverage types including Earthquake loss or damage perils at the Metropolitan Statistical Area level or lower. The Method may comprise generating Loss Trend projections for personal lines Coverage types including Earthquake loss or damage perils on a daily basis or more frequently. The Method may comprise generating Loss Trend projections for personal lines Coverage types including Theft loss or damage perils at the Metropolitan Statistical Area level or lower. The Method may comprise generating Loss Trend projections for personal lines Coverage types including Theft loss or damage perils on a daily basis or more frequently. The Method may comprise generating Loss Trend projections for personal lines Coverage types including Vandalism damage perils at the Metropolitan Statistical Area level or lower. The Method may comprise generating Loss Trend projections for personal lines Coverage types including Vandalism damage perils on a daily basis or more frequently. The Method may comprise generating Loss Trend projections for personal lines Coverage types including Wildfire loss or damage perils at the Metropolitan Statistical Area level or lower. The Method may comprise generating Loss Trend projections for personal lines Coverage types including Wildfire loss or damage perils on a daily basis or more frequently. The Method may comprise generating Loss Trend projections for personal lines Coverage types including Water loss or damage perils at the Metropolitan Statistical Area level or lower. The Method may comprise generating Loss Trend projections for personal lines Coverage types including Water loss or damage perils on a daily basis or more frequently. The Method may comprise generating Loss Trend projections for personal lines Coverage types including Hurricane/Cyclone/Typhoon/Tropical Storm loss or damage perils at the Metropolitan Statistical Area level or lower. The Method may comprise generating Loss Trend projections for personal lines Coverage types including Hurricane/Cyclone/Typhoon/Tropical Storm loss or damage perils on a daily basis or more frequently.

In some examples, a Method may comprise improving the accuracy of aggregate-level Loss Trend projections for Personal Lines casualty insurance policies, generated by the application of Artificial Intelligence Techniques against the 360-Degree Database. The Method may comprise generating Loss Trend projections for personal lines Casualty Coverage types including personal liability umbrella insurance at the Metropolitan Statistical Area level or lower. The Method may comprise generating Loss Trend projections for personal lines Casualty Coverage types including personal liability umbrella insurance on a daily basis or more frequently. The Method may comprise generating Loss Trend projections for personal lines Coverage types including personal comprehensive liability insurance at the Metropolitan Statistical Area level or lower. The Method may comprise generating Loss Trend projections for personal lines Coverage types including personal comprehensive liability insurance on a daily basis or more frequently. The Method may comprise generating Loss Trend projections for personal lines Coverage types including personal excess liability insurance at the Metropolitan Statistical Area level or lower. The Method may comprise generating Loss Trend projections for personal lines Coverage types including personal excess liability insurance on a daily basis or more frequently. The Method may comprise generating Loss Trend projections for personal lines Coverage types including Renter's liability insurance at the Metropolitan Statistical Area level or lower. The Method may comprise generating Loss Trend projections for personal lines Coverage types including Renter's liability insurance on a daily basis or more frequently. The Method may comprise generating Loss Trend projections for personal lines Coverage types including Landlord liability insurance at the Metropolitan Statistical Area level or lower. The Method may comprise generating Loss Trend projections for personal lines Coverage types including Landlord liability insurance on a daily basis or more frequently.

In some examples, a Method may comprise improving the accuracy of aggregate-level Loss Trend projections for Commercial Lines property insurance policies. The Method may comprise generating policy-level Loss Trend projections for Commercial Lines property insurance coverage types including Commercial General Liability Insurance at the Metropolitan Statistical Area level or lower. The Method may comprise generating policy-level Loss Trend projections for Commercial Lines property insurance coverage types including Commercial General Liability insurance on a daily basis or more frequently. The Method may comprise generating policy-level Loss Trend projections for Commercial Lines property insurance coverage types including Commercial Umbrella Insurance at the Metropolitan Statistical Area level or lower. The Method may comprise generating policy-level Loss Trend projections for Commercial Lines property insurance coverage types including Commercial Umbrella Insurance on a daily basis or more frequently. The Method may comprise generating policy-level Loss Trend projections for Commercial Lines property insurance coverage types including Commercial Foreign Auto insurance at the Metropolitan Statistical Area level or lower. The Method may comprise generating policy-level Loss Trend projections for Commercial Lines property insurance coverage types including Commercial Foreign Auto insurance on a daily basis or more frequently. The Method may comprise generating policy-level Loss Trend projections for Commercial Lines property insurance coverage types including Equipment/Mechanical Breakdown, Repair, and/or Replacement insurance at the Metropolitan Statistical Area level or lower. The Method may comprise generating policy-level Loss Trend projections for Commercial Lines property insurance coverage types including Equipment/Mechanical Breakdown, Repair, and/or Replacement insurance at the Metropolitan Statistical Area level or lower on a daily basis or more frequently. The Method may comprise generating policy-level Loss Trend projections for Commercial Lines property insurance coverage types including Debris Removal insurance at the Metropolitan Statistical Area level or lower. The Method may comprise generating policy-level Loss Trend projections for Commercial Lines property insurance coverage types including Debris Removal insurance on a daily basis or more frequently. The Method may comprise generating policy-level Loss Trend projections for Commercial Lines property insurance coverage types including Builders' Risk insurance at the Metropolitan Statistical Area level or lower. The Method may comprise generating policy-level Loss Trend projections for Commercial Lines property insurance coverage types including Builders' Risk insurance on a daily basis or more frequently. The Method may comprise generating policy-level Loss Trend projections for Commercial Lines property insurance coverage types including Glass repair/replacement insurance at the Metropolitan Statistical Area level or lower. The Method may comprise generating policy-level Loss Trend projections for Commercial Lines property insurance coverage types including Glass repair/replacement insurance on a daily basis or more frequently. The Method may comprise generating policy-level Loss Trend projections for Commercial Lines property insurance coverage types including Inland Marine insurance at the Metropolitan Statistical Area level or lower. The Method may comprise generating policy-level Loss Trend projections for Commercial Lines property insurance coverage types including Inland Marine insurance on a daily basis or more frequently. The Method may comprise generating policy-level Loss Trend projections for Commercial Lines property insurance coverage types including Business Interruption insurance at the Metropolitan Statistical Area level or lower. The Method may comprise generating policy-level Loss Trend projections for Commercial Lines property insurance coverage types including Business Interruption insurance on a daily basis or more frequently. The Method may comprise generating policy-level Loss Trend projections for Commercial Lines property insurance coverage types including Ordinance/Law Insurance at the Metropolitan Statistical Area level or lower. The Method may comprise generating policy-level Loss Trend projections for Commercial Lines property insurance coverage types including Ordinance/Law Insurance on a daily basis or more frequently. The Method may comprise generating policy-level Loss Trend projections for Commercial Lines property insurance coverage types including Tenants Insurance at the Metropolitan Statistical Area level or lower. The Method may comprise generating policy-level Loss Trend projections for Commercial Lines property insurance coverage types including Tenants Insurance on a daily basis or more frequently. The Method may comprise generating policy-level Loss Trend projections for Commercial Lines property insurance coverage types including Theft/Vandalism/Other Crime Insurance at the Metropolitan Statistical Area level or lower. The Method includes generating policy-level Loss Trend projections for Commercial Lines property insurance coverage types including Theft/Vandalism/Other Crime Insurance on a daily basis or more frequently. The Method may comprise generating policy-level Loss Trend projections for Commercial Lines property insurance coverage types including Fidelity Bond insurance at the Metropolitan Statistical Area level or lower. The Method may comprise generating policy-level Loss Trend projections for Commercial Lines property insurance coverage types including Fidelity Bond insurance on a daily basis or more frequently. The Method may comprise generating policy-level Loss Trend projections for Commercial Lines property insurance coverage types including Fire and/or Smoke damage or loss insurance at the Metropolitan Statistical Area level or lower. The Method may comprise generating policy-level Loss Trend projections for Commercial Lines property insurance coverage types including Fire and/or Smoke damage or loss insurance on a daily basis or more frequently.

In some examples, a method may comprise improving the accuracy of aggregate-level Loss Trend projections for Commercial Lines casualty insurance policies, generated by the application of Artificial Intelligence Techniques against the 360-Degree Database. The Method may comprise generating Loss Trend projections for Commercial Lines casualty insurance coverage types including Commercial General Liability insurance at the Metropolitan Statistical Area level or lower. The Method may comprise generating policy-level Loss Trend projections for Commercial Lines casualty insurance coverage types including Commercial General Liability insurance on a daily basis or more frequently. The Method may comprise generating policy-level Loss Trend projections for Commercial Lines casualty insurance coverage types including Commercial Errors and Omissions Insurance at the Metropolitan Statistical Area level or lower. The Method may comprise generating policy-level Loss Trend projections for Commercial Lines casualty insurance coverage types including Commercial Errors and Omissions Insurance on a daily basis or more frequently. The Method may comprise generating policy-level Loss Trend projections for Commercial Lines casualty insurance coverage types including Commercial Workers Compensation Insurance at the Metropolitan Statistical Area level or lower. The Method may comprise generating policy-level Loss Trend projections for Commercial Lines casualty insurance coverage types including Commercial Workers Compensation Insurance on a daily basis or more frequently. The Method may comprise generating policy-level Loss Trend projections for Commercial Lines casualty insurance coverage types including Commercial Umbrella Insurance at the Metropolitan Statistical Area level or lower. The Method may comprise generating policy-level Loss Trend projections for Commercial Lines casualty insurance coverage types including Commercial Umbrella Insurance on a daily basis or more frequently. The Method may comprise generating policy-level Loss Trend projections for Commercial Lines casualty insurance coverage types including Commercial Excess Liability Insurance at the Metropolitan Statistical Area level or lower. The Method may comprise generating policy-level Loss Trend projections for Commercial Lines casualty insurance coverage types including Commercial Excess Liability Insurance on a daily basis or better. The Method may comprise generating policy-level Loss Trend projections for Commercial Lines casualty insurance coverage types including Commercial Foreign Liability Insurance at the Metropolitan Statistical Area level or lower. The Method may comprise generating policy-level Loss Trend projections for Commercial Lines casualty insurance coverage types including Commercial Foreign Liability Insurance on a daily basis or better. The Method may comprise generating policy-level Loss Trend projections for Commercial Lines casualty insurance coverage types including Commercial Foreign Workers Compensation Insurance at the Metropolitan Statistical Area level or lower. The Method may comprise generating policy-level Loss Trend projections for Commercial Lines casualty insurance coverage types including Commercial Foreign Workers Compensation Insurance on a daily basis or better. The Method may comprise generating policy-level Loss Trend projections for Commercial Lines casualty insurance coverage types including Malpractice insurance at the Metropolitan Statistical Area level or lower. The Method may comprise generating policy-level Loss Trend projections for Commercial Lines casualty insurance coverage types including Malpractice insurance at the Metropolitan Statistical Area level or lower.

In some examples, the 360-Degree Database+Artificial Intelligence Techniques may be used to generate policyholder-specific Loss Cost Predictions (Predictions for Loss Frequency and Loss Severity) for any personal or commercial lines property and/or casualty coverage at the MSA level or better, and on a daily basis or more frequently, for use in pricing individual property or individual casualty insurance policies for any term length.

In some examples, the 360-Degree Database+Artificial Intelligence Techniques may also be used to generate coverage-specific Loss Trend Projections (Projections for Loss Frequency and Loss Severity) for any personal or commercial lines property and/or casualty coverage at the MSA level or better, and on a daily basis or more frequently, for use in creating rate structures for property or casualty insurance coverages in order for insurers to comply with State regulatory requirements.

In some examples, rates for both personal lines and commercial lines property and casualty insurance policies may be the sum of policyholder-specific loss cost predictions for the desired coverages over the desired term length, plus the insurance carriers target profit over and above associated expenses.

In some examples, rate structures for both personal lines and commercial lines property and casualty insurance coverage types may often be State-specific. These rate ranges may be set based on the sum of aggregate coverage-specific loss trend projections over time (determined by the regulatory agency).

This specification has been written with reference to various non-limiting and non-exhaustive embodiments or examples. However, it will be recognized by persons having ordinary skill in the art that various substitutions, modifications, or combinations of any of the disclosed embodiments or examples (or portions thereof) may be made within the scope of this specification. Thus, it is contemplated and understood that this specification supports additional embodiments or examples not expressly set forth in this specification. Such embodiments or examples may be obtained, for example, by combining, modifying, or reorganizing any of the disclosed steps, components, elements, features, aspects, characteristics, limitations, and the like, of the various non-limiting and non-exhaustive embodiments or examples described in this specification.

We claim:

1. A system, comprising:
   a memory that stores instructions; and
   a processor that executes the instructions to perform operations, the operations comprising:
   fetching a set of data from a data source external to a database;
   determining that the fetched set of data is unstructured data;
   following the determination that the fetched set of data is unstructured data, transforming the fetched set of data into structured data;
   determining one or more lowest denominators for the fetched set of data, the one or more lowest denominators comprising one or more of a spatial denominator and a temporal denominator;
   determining that the fetched set of data does not meet the one or more lowest denominators;
   following the determination that the fetched set of data does not meet the one or more lowest denominators, transforming the fetched set of data to meet the one or more lowest denominators;
   determining one or more joinable keys for the fetched set of data, the one or more joinable keys providing a connection to a set of data stored in the database; and
   merging the fetched set of data into the database with the set of data stored in the database.

2. The system of claim 1, further comprising:
   transmitting a query to the database for a portion of data stored in the database;
   receiving the queried portion of data from the database;
   transmitting the queried portion of data for use by a user.

3. The system of claim 2, wherein transmitting the queried portion of data for use by a user comprises transmitting the queried portion of data for display to the user.

4. The system of claim 1, further comprising filtering out a portion of the data included in the fetched set of data prior to merging the fetched set of data into the database.

5. A method, comprising:
   fetching, by utilizing instructions from a memory that are executed by a processor, a set of data from a data source external to a database;
   determining that the fetched set of data is unstructured data;
   following the determination that the fetched set of data is unstructured data, transforming the fetched set of data into structured data;
   determining one or more lowest denominators for the fetched set of data, the one or more lowest denominators comprising one or more of a spatial denominator and a temporal denominator;
   determining that the fetched set of data does not meet the one or more lowest denominators;
   following the determination that the fetched set of data does not meet the one or more lowest denominators, transforming the fetched set of data to meet the one or more lowest denominators;
   determining one or more joinable keys for the fetched set of data, the one or more joinable keys providing a connection to a set of data stored in the database; and
   merging the fetched set of data into the database with the set of data stored in the database.

6. A non-transitory computer-readable device comprising instructions, which when loaded and executed by a processor, cause the processor to perform operations comprising:

fetching a set of data from a data source external to a database;
determining that the fetched set of data is unstructured data;
following the determination that the fetched set of data is unstructured data, transforming the fetched set of data into structured data;
determining one or more lowest denominators for the fetched set of data, the one or more lowest denominators comprising one or more of a spatial denominator and a temporal denominator;
determining that the fetched set of data does not meet the one or more lowest denominators;
following the determination that the fetched set of data does not meet the one or more lowest denominators, transforming the fetched set of data to meet the one or more lowest denominators;
determining one or more joinable keys for the fetched set of data, the one or more joinable keys providing a connection to a set of data stored in the database; and
merging the fetched set of data into the database with the set of data stored in the database.

* * * * *